United States Patent
Kawasaki et al.

(10) Patent No.: US 6,332,196 B1
(45) Date of Patent: Dec. 18, 2001

(54) DISK STORAGE APPARATUS AND POWER SUPPLY CONTROL METHOD FOR THE SAME

(75) Inventors: Makoto Kawasaki; Yasuhiko Ichikawa; Shuichi Ishii, all of Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/244,421

(22) Filed: Feb. 4, 1999

(30) Foreign Application Priority Data

Apr. 30, 1998 (JP) .................................................. 10-121140

(51) Int. Cl.[7] .............................. G06F 1/26; G06F 1/28; G06F 1/30
(52) U.S. Cl. ......................... 713/300; 713/320; 713/323; 713/324; 711/111; 710/52; 360/60; 360/67; 360/69; 360/75
(58) Field of Search .................................. 713/300–340; 711/104, 105, 106, 111, 156; 710/52–57; 360/60, 67, 69, 75

(56) References Cited

U.S. PATENT DOCUMENTS 4,553,223 * 11/1985 Bouhelier et al. ............... 713/340 A
5,671,099 * 9/1997 Ishii et al. ............................. 360/69
5,778,420 * 7/1998 Shitara et al. ...................... 711/113
5,905,899 * 5/1999 Kim et al. ........................... 713/300
6,065,124 * 5/2000 Lee ..................................... 713/323

FOREIGN PATENT DOCUMENTS 7-334448  12/1995  (JP) .
9-73705   3/1997   (JP) .

* cited by examiner

Primary Examiner—Rupal Dharia
(74) Attorney, Agent, or Firm—Pillsbury Winthrop LLP

(57) ABSTRACT

A disk control apparatus according to the present invention comprising a disk controller for controlling a circuit which controls read operation for reading data from a disk and a CPU for controlling the circuit and the disk controller. The disk controller comprises a buffer memory for storing data being for transferred between a host and the disk controller and a notification section for notifying the CPU that a first state in which an all buffer region of the buffer memory is stored with data to be transferred to the host transits to a second state in which a predetermined space occurs in the buffer region of the buffer memory as a result of transferring data to the host. The CPU comprises a main control section for stopping power supply to the circuit during the first state and for supplying power to the circuit in response to a notification from the notification section.

16 Claims, 19 Drawing Sheets

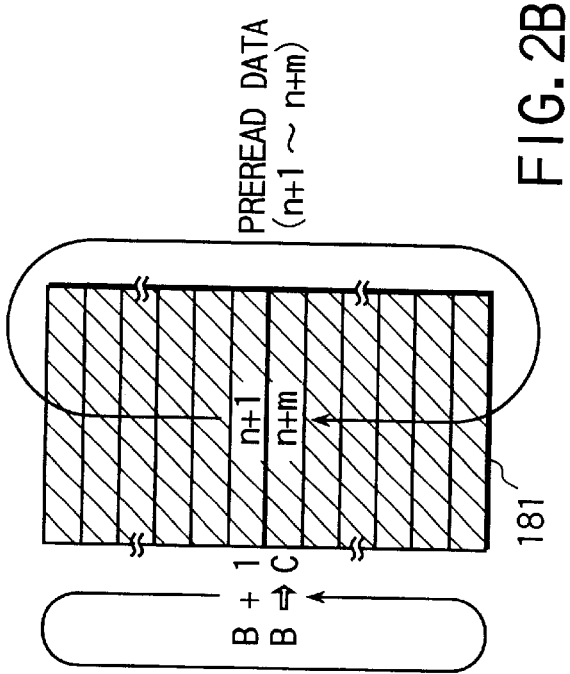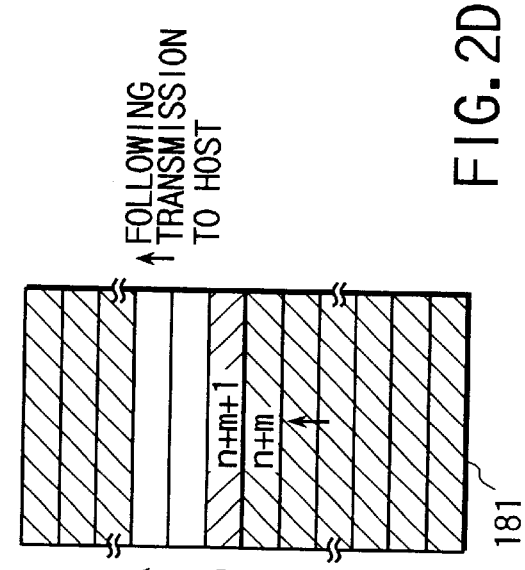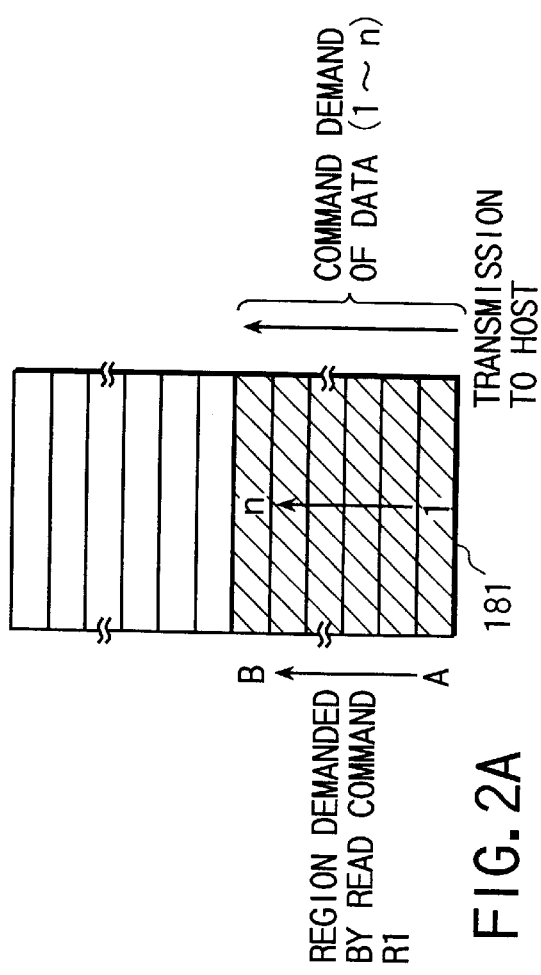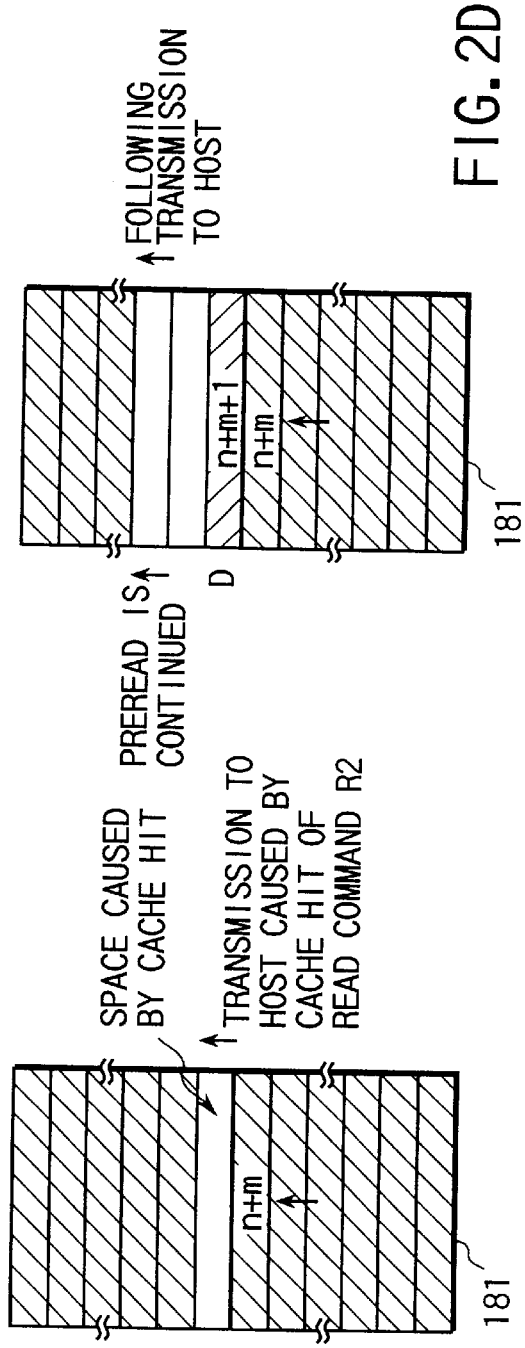

DISK STORAGE APPARATUS AND POWER SUPPLY CONTROL METHOD FOR THE SAME

BACKGROUND OF THE INVENTION

The present invention relates to a disk storage apparatus suitable for reduction in power consumption in a disk access operation. The invention also relates to a power supply control method suitable for reduction in power consumption in a disk access operation.

In general, a function called "preread cache" is provided in a disk storage apparatus, such as a hard-disk drive (HDD), which is connected in use to a host system (hereinafter referred to simply "host") such as a computer system via a host interface.

In the preread cache function, after sectors requested by a read command from the host are read out from a disk (disk medium) and transmitted, data of sectors having sector numbers following the sector number of the last one of the read-out sectors is preread onto a buffer memory in the order of sector numbers. If a sector requested by the next read command from the host coincides with the preread sector, the associated data on the buffer memory is immediately transferred to the host without access to the disk. With this function, the performance of the interface between the disk storage apparatus and the host can be enhanced.

The details of the preread cache function will now be described with reference to FIG. 1 and FIGS. 2A to 2D.

The data of n-sectors, i.e. sector A through sector B, on a disk 180 shown in FIG. 1 which have been requested by a read command R1 from the host is read from the disk 180 onto a read-data buffer region (cache region) defined in a buffer memory 181 under control of an HDC (disk controller), and the data is transferred in parallel to the host (see FIG. 2A). If the transfer of the data requested by the read command R1 is completed, preread is effected.

In general, however, the buffer memory 181 has a less capacity than the disk 180. For example, at the time when sectors from sector B+1((n+1)th sector), which follows sector B, to sector C ((n+m)th sector) have been preread, the buffer memory 181 (or the read-data buffer region thereof) becomes full (see FIG. 2B) and no space remains in the buffer memory 181 for storing the read data. The HDC which controls the buffer memory 181 detects this state and stops the preread.

If the next read command R2 from the host has made a cache hit (i.e. coincidence between the sector read in the buffer memory 181 and the sector requested by the host) and the hit sector data has been transferred to the host and as a result space has been caused in the buffer memory 181 (see FIG. 2C), preread is resumed from sector C+1 (=D) following the last sector (last read-out sector) C preread before the previous preread was stopped (see FIG. 2D).

In the prior art, in order to reduce the power consumption of the HDD in a time period between the temporary stop of preread and the resumption of preread, there is known a method in which power supply to the circuit elements relating to R/W (read/write), that is, R/W circuits relating to read/write channels, disk access of the HDC, etc., is stopped.

An operation in the above prior art, which follows the completion of preread and is accompanied with the above-mentioned power supply control, will now be described with reference to FIGS. 3A and 3B.

In the prior-art technique, the CPU needs to check, at regular intervals, whether space has been caused in the buffer memory. In this case, in order to resume the preread in a shortest time after space has been caused in the buffer memory, the CPU needs to check the buffer memory at a timing at which the sector D, which follows the last sector C read by the preread cache function, has reached a position where read by the magnetic head is permitted at every rotation of the disk 180.

However, if the generation of check timing of the buffer memory is performed only with a timer (CPU timer) of the CPU, the check timing may gradually be shifted due to a timer error from the timing at which the subsequently read sector D reaches the position of the magnetic head. In such a case, an excess time may be needed to actually start read-out after the presence of space is confirmed.

In the prior art, with use of the CPU timer, a timing (i.e. timing at sector X in FIG. 3A) is provided several servos (one servo normally including 2 to 5 sectors) before the subsequently read-out sector D, that is, the next target sector D, arrives at the position of the magnetic head. At this timing, a check is started as to whether space is present in the buffer memory (step P1) and power supply to the P/W circuit is resumed (step S2).

Then, it is checked whether space exists in the buffer memory (step P3).

If there is no space in the buffer memory, the position of the last sector C read out by the preread cache is confirmed, and the CPU timer is reactivated to generate timing of the sector X. After the power to the R/W circuit turned off (step P4), the control returns to step P1. On the other hand, if there is space in the buffer memory, the read-out of sectors beginning with the target sector D is started (step P5).

This method is similarly applied to the write operation. After a write command is completed or when transfer of data from the host has been temporarily stopped, all data transmitted from the host and stored in the buffer memory are written in the disk. If the buffer memory becomes empty in consequence, the CPU stops power supply to the R/W circuit.

In anticipation of write to the next sector, it is checked whether the buffer has become not empty, at every rotation of the disk at a timing generated by the CPU timer. In addition, in order to prevent this timing from shifting from the position of the sector on which data is to be written next, power supply to the R/W circuit is resumed/stopped at every rotation of the disk.

In the above-described prior art, in order to prevent power from being consumed in vain by the R/W circuit while the read/write operation is not actually performed, power supply to the R/W circuit is temporarily stopped and is reapplied to the R/W circuit before a predetermined time read/write operation is resumed in the state in which the buffer memory is full in the read operation and empty in the write operation, and it is checked whether the read/write operation can be resumed.

More specifically, in the above prior art, even after the buffer memory has become full due to the preread cache of the read operation, it is necessary to check the empty state of the data buffer at regular intervals. For this check, power is supplied to the R/W circuit at regular intervals. As a result, power is supplied to the R/W circuit at every rotation of the disk until the next read/write command is issued from the host. According to this method, compared to a method in which power is constantly supplied, the power consumption can be reduced. However, power is consumed to some degree since it is supplied to the R/W circuit at regular intervals until the next command is issued.

In the write operation, too, if the buffer memory has become empty, power is supplied to the R/W circuit at regular intervals, and power is consumed to some degree.

BRIEF SUMMARY OF THE INVENTION

The present invention has been made in consideration with the above situation, and its object is to provide a disk storage apparatus which detects that a buffer memory has a space by a disc controller for controlling the buffer memory and to supply power to a R/W circuit in accordance with the detection result when read operation is executed thereby reducing power consumption in the R/W circuit until next read command is issued from a host. The present invention also provide a power supply control method therefore.

Another object of the present invention is to provide a disk storage apparatus which detects that a buffer memory becomes not empty by a disc controller itself for controlling the buffer memory and to supply power to a R/W circuit in accordance with the detection result when write operation is executed thereby reducing power consumption in the R/W circuit until next read command is issued from a host. The present invention also provide a power supply control method therefore.

To achieve the above objects, according to a first aspect of the present invention, there is provided a disk control apparatus comprising:

a disk controller for controlling a circuit which controls read operation for reading data from a disk to a host; and a CPU for controlling the circuit and the disk controller, wherein the disk controller comprises:

a buffer memory for storing data being for transferred between the host and the disk controller; and a notification means for notifying the CPU that a first state in which an all buffer region of the buffer memory is stored with data to be transferred to the host transits to a second state in which a predetermined space occurs in the buffer region of the buffer memory by transferring data to the host, and the CPU comprises a main control means for stopping power supply to the circuit during the first state and for supplying power to the circuit in response to a notification from the notification means.

According to a second aspect of the present invention, there is provided a disk control apparatus comprising:

a disk controller for controlling a circuit which controls write operation for writing data to a disk from a host; and a CPU for controlling the circuit and the disk controller, wherein the disk controller comprises:

a buffer memory for storing data being for transferred between the host and the disk controller; and a notification means for notifying the CPU that a first state in which data to be written to the disk is not exist in a buffer region of the buffer memory transits to a second state in which a predetermined space occurs in the buffer region of the buffer memory by transferring data from the host, and the CPU comprises a main control means for stopping power supply to the circuit during the first state and for supplying power to the circuit in response to a notification from the notification means.

According to a third aspect of the present invention, there is provided a disk storage apparatus comprising:

read means for reading data form a disk medium;

power control means for controlling drive power supply with regard to the read means;

a buffer memory in which read-data buffer region for temporary storing data read from the disk medium is provided, a disk controller for controlling communications for a command and data to a host, control of the buffer memory and control for reading data from the disk medium through the read means;

buffer control means, provided in the disk controller, for outputting a detection signal in a case where a first state in which an all read-data buffer region of the buffer memory is stored with data to be transferred to the host transits to a second state in which a predetermined space occurs in the read-data region caused by transferring data to the host; and main control means for causing the power control means to stop drive power supply to the read means during the first state and for causing the power control supply to restart drive power supply to the read means in response to the detection signal.

According to a fourth aspect of the present invention, there is provided a disk storage apparatus comprising:

write means for writing data to a disk;

power control means for controlling drive power supply with regard to the write means;

a buffer memory in which write-data buffer region for temporary storing data to be written in the disk medium from a host;

a disk controller for controlling communications for a command and data to the host, control of the buffer memory and control for writing data in the disk medium through the write means;

buffer control means, provided in the disk controller, for outputting a detection signal in a case where a first state in which an all write-data buffer region of the buffer memory has no data to be written in the buffer region transits to a second state in which a predetermined a predetermined data exists in the write-data buffer region caused by transferring data from the host; and main control means for causing the power control means to stop drive power supply to the write means during the first state and for causing the power control supply to restart drive power supply to the write means in response to the detection signal.

According to a fifth aspect of the present invention, there is provided a disk storage apparatus in the third aspect, wherein the buffer control means has a counter of which a counter value is incremented by one every time data having a first predetermined value is read out from the disk medium to the read-data buffer region of the buffer memory through the read means, and of which the counter value is decremented by one every time data having the first predetermined value is transferred to the host from the read-data buffer region, and means for outputting the detection signal when the value of the counter is decremented by a second predetermined value after the counter value is incremented to a value which equals to that a capacitance of the read-data buffer region is divided by the first predetermined value.

According to a sixth aspect of the present invention, there is provided a disk storage apparatus in the third aspect, wherein the buffer control means comprises:

a disk pointer for indicating a first data address in the buffer memory, the first data address in which data read from the disk medium through the read means to be stored;

a host pointer for indicating a second data address in the buffer memory, the second data address to which data to be transferred next; and means for outputting the detection signal in a case where the host pointer decreases by a predetermined value after the disk pointer corresponds to the host pointer.

According to a seventh aspect of the present invention, there is provided a disk storage apparatus in the third aspect, wherein the buffer control means comprises:

a first counter of which a value is incremented by one every time data having a first predetermined value is read out from the disk medium through the read means to the read-data buffer region of the buffer memory;

a second counter of which a value is incremented by one every time data having the first predetermined value is transferred to the host from the read-data buffer region of the buffer memory; and means for outputting the detection signal when a difference value between the values of the first and second counters are decremented to a second predetermined value after the difference value is incremented to a value which equals to that a capacitance of the read-data buffer region is divided by the first predetermined value.

According to an eighth aspect of the present invention, there is provided a disk storage apparatus in the fourth aspect, wherein the buffer control means has a counter of which a counter value is incremented by one every time data having a first predetermined value is read out from the host to the write-data buffer region of the buffer memory through the read means, and of which the counter value is decremented by one every time data having the first predetermined value is written into the disk medium from the write-data buffer region through the write means; and means for outputting the detection signal when the value of the counter is incremented by a second predetermined value after the counter value equals to a zero by subtraction.

According to a ninth aspect of the present invention, there is provided a disk storage apparatus in the fourth aspect, wherein the buffer control means comprises:

a host pointer for indicating a first data address in the buffer memory, the first data address in which data read from the host to be stored;

a disk pointer for indicating a second data address in the buffer memory, the second data address in which data to be stored next; and means for outputting the detection signal in a case where the host pointer is incremented by a predetermined value after the disk pointer corresponds to the host pointer.

According to a 10th aspect of the present invention, there is provided a disk storage apparatus in the fourth aspect, wherein the buffer control means comprises:

a first counter of which a value is incremented by one every time data having a first predetermined value is read out from the write-data buffer region of the buffer memory through the write means to the disk medium;

a second counter of which a value is incremented by one every time data having the first predetermined value is transferred to the write-data buffer region of the buffer memory from the host; and means for outputting the detection signal when a difference value between the values of the first and second counters are incremented to a second predetermined value after the difference value is incremented to a zero by addition.

According to a 11th aspect of the present invention, there is provided a disk storage apparatus in the third aspect, wherein the main control means is a CPU and receives the detection signal as an interrupt signal.

According to a 12th aspect of the present invention, there is provided a disk storage apparatus in the fourth aspect, wherein the main control means is a CPU and receives the detection signal as an interrupt signal.

According to a 13th aspect of the present invention, there is provided a disk controller comprising:

disk control means for controlling data read from a disk medium; and buffer control means for controlling a buffer memory in which read-data buffer region for temporary storing data read from the disk medium by using the disk control means, wherein the buffer control means comprises buffer monitor means for outputting a detection signal to a CPU as an interrupt signal in a case where a first state in which all read-data buffer region of the buffer memory is stored with data to be transferred to a host transits to a second state in which a predetermined space occurs in the read-data buffer region of the buffer memory caused by transferring data to the host.

According to a 14th aspect of the present invention, there is provided a disk controller comprising:

disk control means for controlling data write to a disk medium; and buffer control means for controlling a buffer memory in which write-data buffer region for temporary storing data transferred from a host, wherein the buffer control means comprises buffer monitor means for outputting a detection signal to a CPU as an interrupt signal in a case where a first state in which all write-data buffer region of the buffer memory has no data to be written to the disk medium by using the disk control means transits to a second state in which a predetermined amount of data to be written exists by transferring data from a host.

According to a 15th aspect of the present invention, there is provided a power supply control method comprising the steps of:

stopping drive power supply to a circuit for reading data from a disk medium during a first state in which all buffer region for temporary storing data read from the disk medium is stored with data to be transferred to a host;

outputting a detection signal when the first state transits to a second state in which a predetermined space occurs in the read-data buffer region by transferring data to the host; and supplying drive power to the circuit in response to the detection signal.

According to a 16th aspect of the present invention, there is provided a power supply control method comprising the steps of:

stopping power supply to a circuit for writing data to a disk medium during a first state in which no data exists in a write-buffer region for temporary storing data to the disk medium;

outputting a detection signal in a case where the first state transits to a second state in which a predetermined amount of data to be written exists in the write-buffer region by transferring data from the host; and supplying drive power to the circuit in response to the detection signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a view for explaining details of the preread cache function;

FIG. 2B is a view for explaining details of the preread cache function;

FIG. 2C is a view for explaining details of the preread cache function;

FIG. 2D is a view for explaining details of the preread cache function;

DETAILED DESCRIPTION OF THE INVENTION

Outline of the Invention

Figure 1:
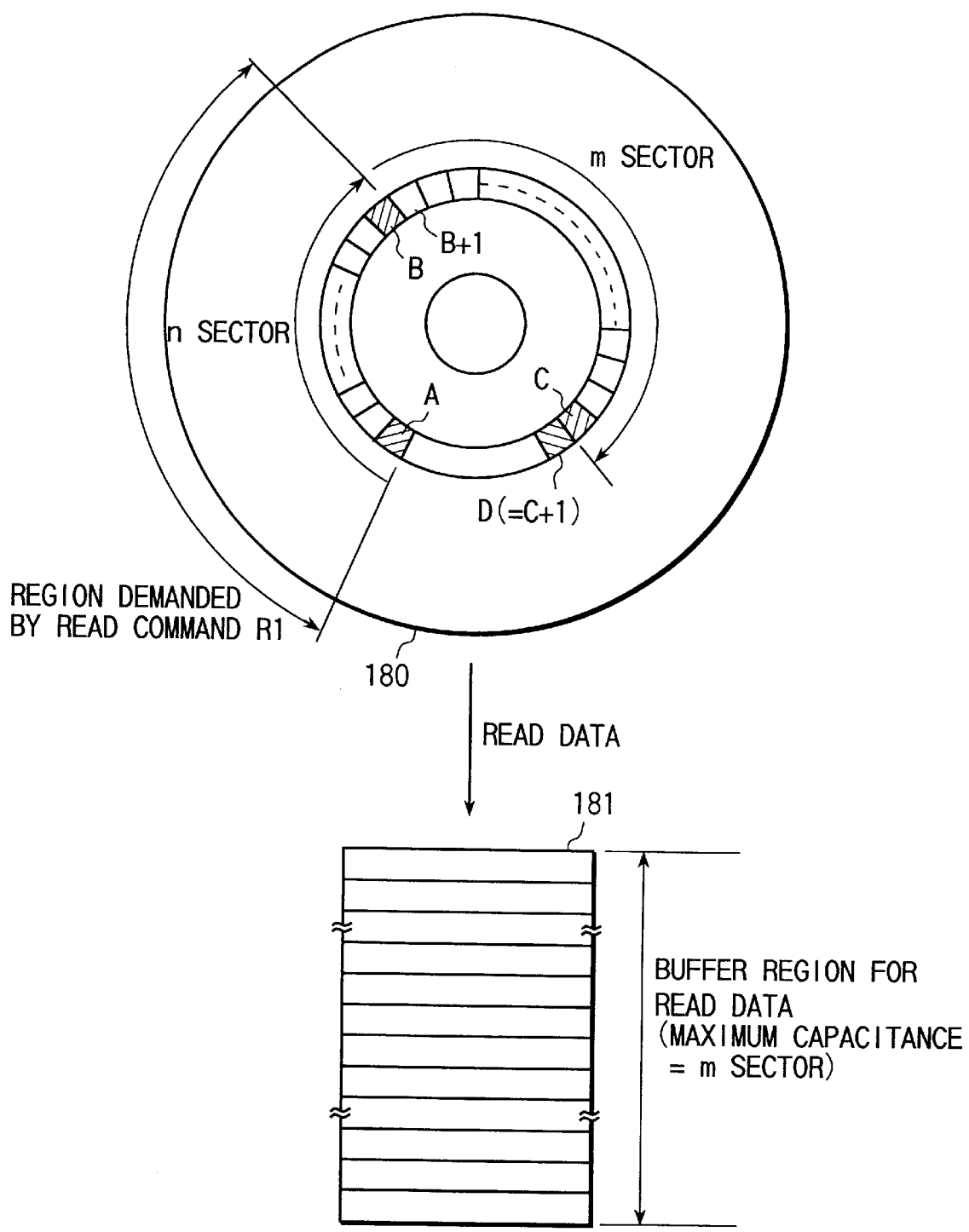
FIG. 1 is a view for explaining details of a preread cache function.
Figure 3A:
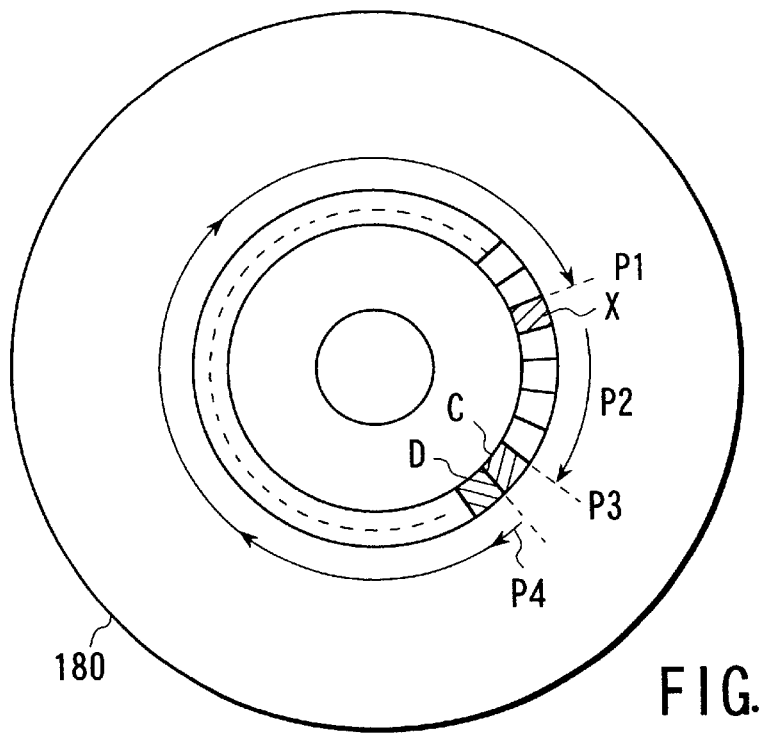
FIG. 3A is a view illustrating an operation following the end of preread cache in the prior art.
Figure 3B:
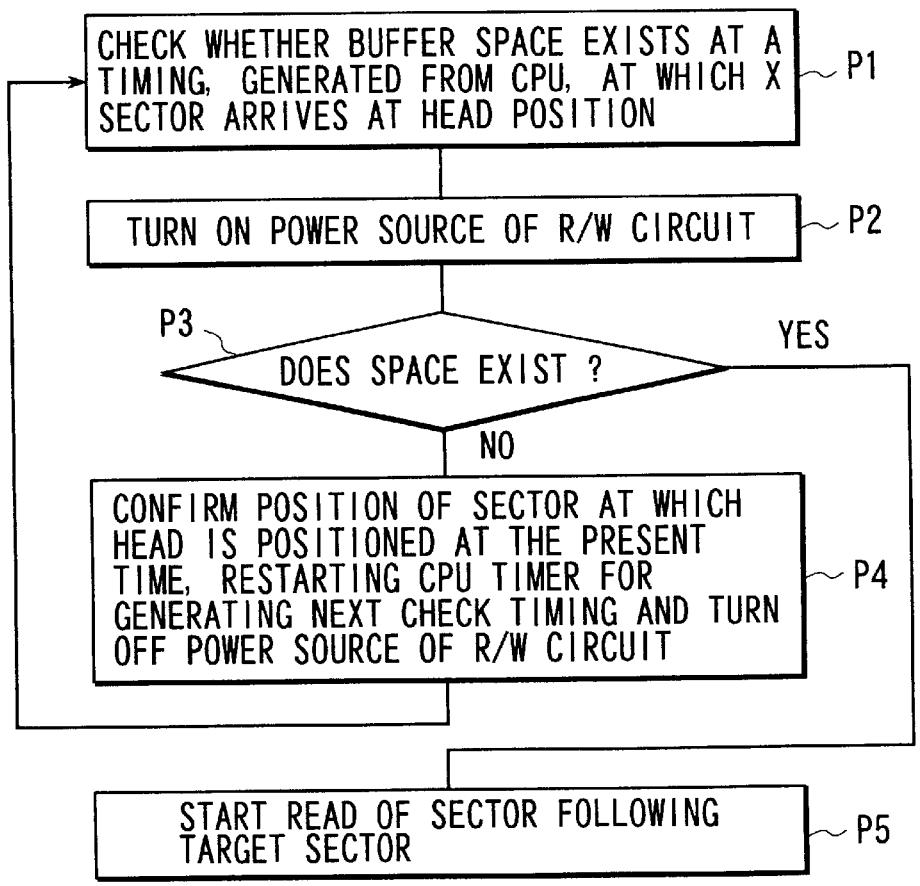
FIG. 3B is a flow chart illustrating the operation following the end of preread cache in the prior art.

The present invention relates to a disk storage apparatus having a buffer memory in which a read-data buffer area is defined for temporarily storing data read out from a disk medium. The disk storage apparatus is characterized in that:

A disk controller for controlling communication of commands and data with a host, controlling the buffer memory and controlling data read-out from the disk medium via a read-out section is provided with a buffer control section for detecting a transition from a first state in which the read-data buffer area defined in the buffer memory is filled with data yet to be transferred to the host to a second state in which a predetermined amount of space is caused in the read-data buffer area by the transfer of data to the host, and outputting a corresponding detection signal; and There is provided a main control section for halting power supply to the read-out section while the read-data buffer area is filled with data yet to be transferred to the host, and for resuming power supply to the read-out section in accordance with the detection signal from the buffer control section.

In the above structure, when a disk read-out operation is executed, the buffer control section itself in the disk controller for controlling the buffer memory monitors the state of the read-data buffer area in the buffer memory. If the buffer control section detects a transition from the first state in which the read-data buffer area is filled with data yet to be transferred to the host to the second state in which a predetermined amount of space is caused in the read-data buffer area by the transfer of data to the host, that is, if the buffer control section detects that the buffer area was once filled with the data yet to be transferred to the host and subsequently the data was transferred to the host due to, e.g. a cache hit of the next read command and consequently a predetermined amount of space was caused in the buffer region, the buffer control section outputs the corresponding detection signal to the main control section.

Upon receiving the detection signal, the main control section can immediately resume the power supply to the read-out section (read circuit portion). In this case, the read-out of data from the disk medium to the buffer memory is resumed after a record unit, which is to be read next, has reached the head position.

In the present invention, as described above, when the disk read-out operation is to be executed, the buffer control section itself in the disk controller detects the state in which the buffer area has become full, and sends the corresponding detection signal to the main control section such as a CPU. Thus, there is no need to resume power supply to the read-out section at every rotation of the disk medium in order to check the state of the buffer memory, although this was done by the CPU in the prior art. Therefore, the power consumption can be reduced that much. In other words, compared to the prior art, further power saving can be achieved.

Besides, the timing at which space is created in the buffer area is asynchronous with the timing at which the next read-out record unit reaches the head position. Thus, the present invention does not lose the feature of the prior art that data is read out from the disk medium within a minimum time after space is created in the buffer area.

What is described above is applicable to the disk write operation. In the present invention, when a disk write operation is executed, the buffer control section itself in the disk controller monitors the state of the write-data buffer area in the buffer memory. If the buffer control section detects a transition from the first state in which the buffer area contains no data to be written in the disk medium to the second state in which a predetermined amount of non-written data is present due to transfer of new data from the host, that is, if the buffer control section detects that the buffer area was once emptied and subsequently the buffer area is no longer empty due to the transfer of write data according to a new write command from the host, the buffer control section outputs the corresponding detection signal to the main control section. Upon receiving the detection signal, the main control section resumes the power supply to the write section (write circuit portion). If power supply is resumed, the write of data to the disk medium is resumed after a record unit, which is to be written next, has reached the head position.

In the present invention, as described above, when the disk write operation is to be executed, the buffer control section itself in the disk controller detects the state in which the buffer area is no longer empty, and sends the corresponding detection signal to the main control section such as a CPU. Thus, there is no need to resume power supply to the write section at every rotation of the disk medium in order to check the state of the buffer memory, although this was done by the CPU in the prior art. Therefore, the power consumption can be reduced that much. In other words, compared to the prior art, further power saving can be achieved.

In the above structure, if the main control section is constituted by the CPU and the detection signal output from the buffer control section is designed to be input to the CPU (in particular, an interrupt input terminal thereof) as an interrupt signal to the CPU, the processing in the main control section can be efficiently performed at the time of outputting the detection signal.

It is better to constantly supply power to a component (e.g. register) in the read/write circuit, which retains information on a record unit to be read/written next, so that data read from the disk medium or data write in the disk medium can be immediately resumed when, following the resumption of power supply, the record unit to be read/written next has reached the head position.

Embodiments of the Invention

A hard-disk drive (HDD) according to an embodiment of the present invention will now be described with reference to the accompanying drawings.

Figure 4:
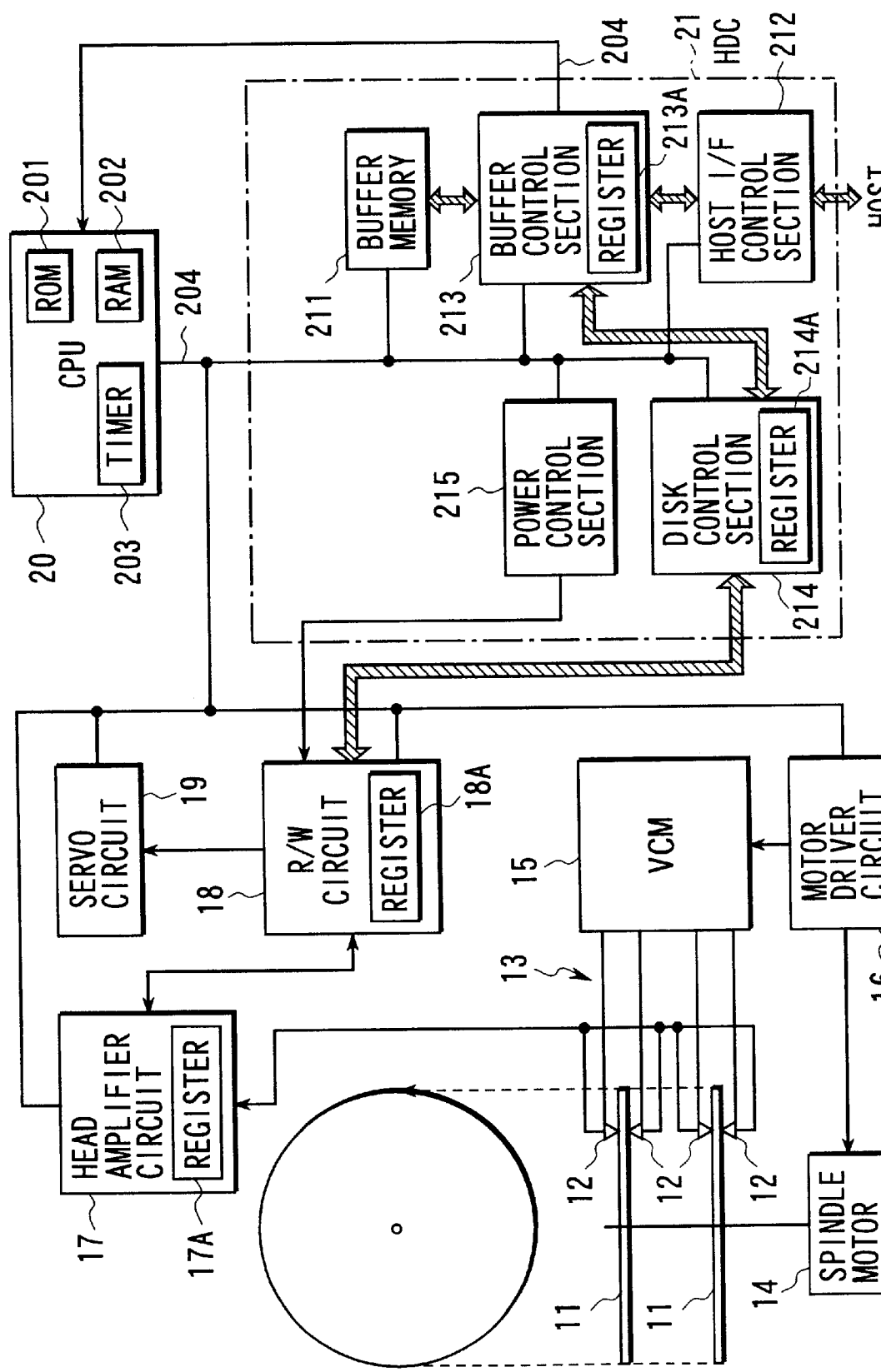
FIG. 4 is a block diagram showing the structure of a hard-disk drive according to an embodiment of the present invention.

FIG. 4 is a block diagram showing the structure of the hard-disk drive (HDD) according to the embodiment.

In the structure shown in FIG. 4, it is supposed to use a magnetic disk apparatus in which two disks (magnetic recording media) 11 are stacked. A number of concentric tracks (not shown) are formed on both surfaces (both recording surfaces) of each disk 11. Servo areas, on which servo information for use in seeking/positioning the head is recorded, are arranged on each track at regular intervals. An area between the servo areas is used as a user area. Sectors (data sectors), which are record units (normally two to five units), are arranged on the user area. The servo areas are arranged on the disk 11 radially from its center at regular intervals over the tracks.

In order to efficiently use outer peripheral regions on the disk 11, where the physical circumferential length of the tracks (cylinders) is great, and to enhance the formatting efficiency of the disk 11, a CDR (Constant Density Recording) format system is applied to the disk 11. In this format system, the recording surface of the disk 11 is divided into a plurality of zones. The number of data sectors per cylinder (track) varies from zone to zone (the number increasing toward the outermost zone), that is, the data transfer rate (transfer rate) varies from zone to zone (the transfer rate increasing toward the cylinder of the outermost zone).

Since the above-described format of the disk 11 is well known, it is not shown in the drawings.

Heads (magnetic heads) 12 are provided to face the associated recording surfaces of the disks 11, respectively. The heads 12 are attached respectively to associated carriages (head moving mechanisms) 13 serving as rotary actuators. In accordance with the rotation of the carriage 13, the associated head 12 moves radially of the disk 11. Thereby, the head 12 is sought/positioned to a target track. The disks 11 are rotated at high speed by a spindle motor (SPM) 14. The carriages 13 are driven by a voice coil motor (VCM) 15.

The spindle motor 14 and voice coil motor 15 are connected to a motor driver circuit (motor driver IC) 16. The motor driver circuit 16 supplies a control current to the spindle motor 14 to drive the same, and also supplies a control current to the voice coil motor 15 to drive the same. The values (control amounts) of the control currents are determined by a CPU 20 by a calculation process.

After the head 12 is sought/positioned to the target track, the disk 11 is rotated and thus the head 12 scans the track. The head 12 successively reads, by the scanning, the servo information on the servo areas arranged at regular intervals on the track. The head 12 reads/writes data on the target data sector by the scanning.

Each head 12 is connected to a head amplifier circuit 17 (head IC) mounted on a flexible printed wiring board (FPC). The head amplifier circuit 17 controls switching among the heads 12 (under control of the CPU 20) and the input/output of read/write signals. The head amplifier circuit 17 amplifies analog outputs (read signals of heads 12) read from the heads 12 and subjects write data sent from an R/W (read/write) circuit (read/write IC) 18 to a predetermined signal process and outputs the processed data to the heads 12.

The R/W circuit 18 have the following functions:

An AGC (automatic gain control) function for amplifying up to a predetermined voltage level an analog output (read signal from the head 12) which was read from the disk 11 by the head 12 and amplified by the head amplifier circuit 17;

A decoding function (read channel) for performing a signal process necessary for reproducing data of, e.g. NRZ code, from the read signal amplified by the AGC function, A encoding function (write channel) for performing a signal process necessary for recording data on the disk 11; and A pulse generating function for converting the read signal to pulses and outputting the pulse-form read data, thereby enabling servo information extraction from the read signal.

A servo circuit 19 extracts a cylinder code in servo information, etc. (necessary for seeking of the head 12) from the read pulse output from the R/W circuit 18, extracts burst data (position error data) in the servo information (necessary for positioning control of head 12) from the read signal output from the R/W circuit 18 (and amplified by the AGC function), and outputs the extracted results to the CPU 20.

According to the control programs stored in the ROM (Read-Only Memory) 201, the CPU (Central Processing Unit) 20 performs controls of respective parts of the HDD, for example, a seek/positioning control of the head 12 on the basis of the cylinder code and burst data extracted by the servo circuit 19, and a read/write control by an HDC 21 in accordance with the read/write command from the host. The CPU 20 includes, in addition to the ROM 201, a RAM (Random Access Memory) 202 for providing a working area for the CPU 20, and a timer 203.

The HDC 21 controls communication of commands and data with the host, as well as performing a buffer control, a data transfer control for data transfer with the disk 11, and a power supply control for power supply to the R/W circuit 18. The HDC 21 includes a buffer memory 211, a host I/F control section 212, a buffer control section 213, a disk control section 214 and a power control section 215.

The buffer memory 211 comprises, e.g. a RAM and is used for temporarily storing data (read data) read out from the disk 11 to be transferred to the host, and data (write data) transferred from the host to be written in the disk 11. A read-data buffer area and a write-data buffer area (both not shown) are defined in the buffer memory 211.

The host I/F control section 212 controls communication of commands and data with the host connected via a host interface (not shown).

The buffer control section 213 performs an access control for access to the buffer memory 211, management of data stored in the buffer memory 211, and management of areas in the buffer memory 211.

The disk control section 214 controls a disk read operation and a disk write operation. In the disk read operation, the disk control section 214 reads out data requested by the host from the disk 11 via the R/W circuit 18 and transfers the read-out data to the buffer memory 211 via the buffer control section 213. In the disk write operation, the disk control section 214 receives write data from the buffer memory 211 via the buffer control section 213 and writes the received data on the disk 11 via the R/W circuit 18.

The power control section 215 controls start/stop of power supply to the R/W circuit 18 in accordance with an instruction from the CPU 20.

The buffer memory 211, host I/F control section 212, buffer control section 213, disk control section 214 and power control section 215 in the HDC 21, as well as the head amplifier circuit 17, R/W circuit 18 and servo circuit 19, are connected to a bus 204 of the CPU 20.

The operation of the structure shown in FIG. 4 will now be described by referring to, for example, a case where read commands have been received from the host.

Suppose that a read command has been issued to the HDD in FIG. 4 from the host via the host interface. The host I/F control section 212 in the HDC 21 receives the read command from the host interface and notifies the CPU 20 of the reception of the read command by means of an interrupt signal. If the CPU 20 receives the interrupt signal indicating that the HDC 21 (specifically, the host I/F control section 212) has received the command from the host, the CPU 20 takes in the received command from the HDC 21 (the host I/F control section 212) and interprets the command.

In a case where the received command is a read command, in order to perform a disk read operation within a range requested by the read command, the CPU 20 sets, in a register 214A provided in the disk control section 214 within the HDC 21, information on the physical position on the disk of the first sector within the range to be accessed, and also sets, in the buffer control section 213 within the HDC 21, information on the position on the buffer memory 211 from which the read data is to be stored.

Subsequently, the CPU 20 controls the spindle motor 14 and voice coil motor 15 by means of the motor driver circuit 16, thereby moving the head 12 to seek the track on which the access target sector is present. Taking advantage of the time period during which the head 12 is seeking the track, the CPU 20 sets the values, such as a filtering constant, which are proper to a zone (i.e. a position on the disk 11) including the sector to be accessed, in a register 18A in the R/W circuit 18 and a register 17A in the head amplifier circuit 17.

The registers 17A, 18A and 214A serve as switches for supplying power to the head amplifier circuit 17, R/W circuit 18 and disk control section 214, respectively.

In the present embodiment, in principle, when the disk access is not executed, power supply is stopped to the main components in the disk control section 214 in the HDC 21 and those in the R/W circuit 18, but power is supplied only to the registers in the disk control section 214 and R/W circuit 18. The values of power to be supplied can be freely set.

If the seek of the head 12 to the track including the access target sector is completed and the head 12 reaches a position preceding the access target sector by a distance corresponding to a predetermined number of servos (normally a distance corresponding to several sectors), the CPU 20 instructs the power control section 215 within the HDC 21 to supply power to the hardware components (R/W-related circuits) relating to the disk access, that is, the R/W circuit 18 and the disk control section 214 within the HDC 21, other than the registers which have been already powered.

When the head 12 has reached the position of the access target sector, the disk control section 214 within the HDC 21 opens a read circuit, or a so-called read gate. Thereby, data on the disk 11 is read successively from the target sector and transferred to the buffer memory 211 via the head amplifier circuit 17, R/W circuit 18, disk control section 214 within HDC 21 and buffer control section 213 within HDC 21. The data is then stored in succession from the position set by the CPU 20 after the read-data buffer area on the buffer memory 211.

If data of more than a predetermined number of sectors (e.g. one sector) is stored in the read-data buffer area in the buffer memory 211, the buffer control section 213 within the HDC 21 successively reads out the read data stored in the buffer area from the disk 11, and starts an operation for transferring the read-out data to the host through the host I/F control section 212.

The above-described read-out of data from the disk 11 to the buffer 211 and the transfer of data from the buffer memory 211 to the host are performed in parallel under control of the HDC 21. In FIG. 4, the buffer memory 211 and power control section 215 are provided within the HDC 21. The buffer memory 211 and power control section 215, however, may be provided outside the HDC 21.

In the HDC 21, data of subsequent sectors on the disk 11 continues to be read in the order of sector numbers even after the read-out of data from the disk 11, which has been requested by the host, is completed, the transfer of the requested data ends and the read command ends. This is called the preread cache.

Figure 5A:
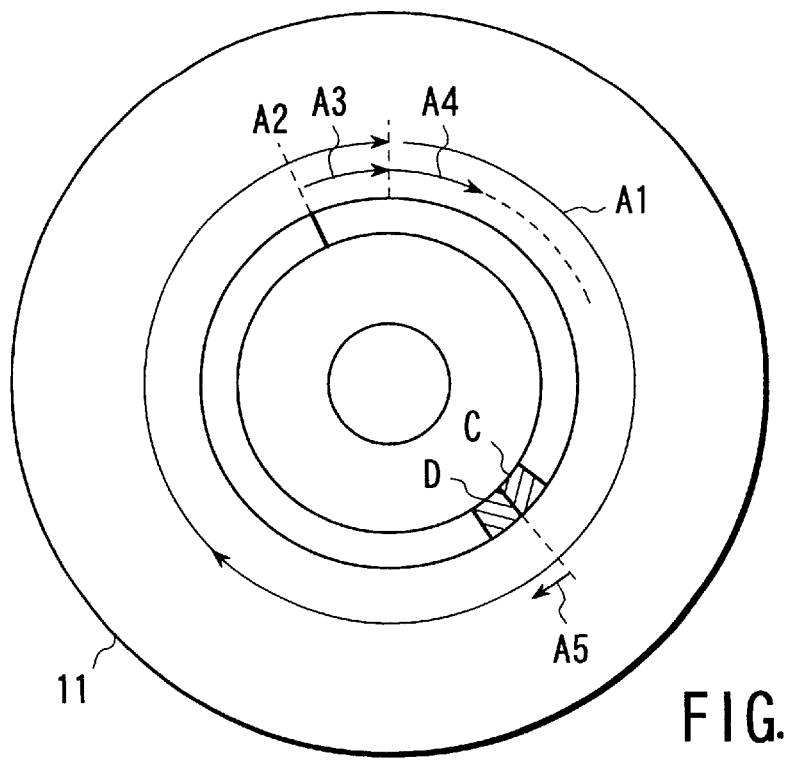
FIG. 5A is a view for explaining an operation following the end of preread cache in the first embodiment.
Figure 5B:
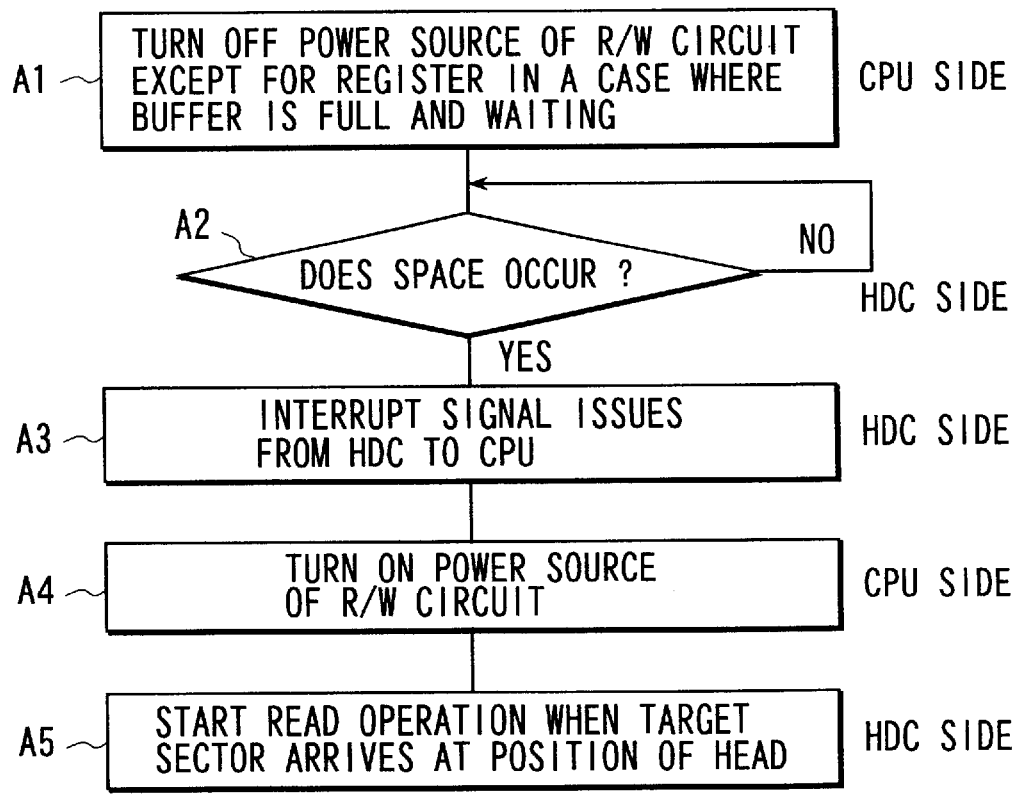
FIG. 5B is a flow chart illustrating the operation following the end of preread cache in the first embodiment.

The operation after the end of the preread cache will now be described with reference to FIGS. 5A and 5B.

The preread operation (preread cache operation) of the HDC 21 for prereading data from the disk 11 is continued until the entire read-data buffer area on the buffer memory 211 is filled with the preread data (this state being called "full state of buffer memory 211" for the convenience's sake). If the buffer memory 211 has become full and the preread by the HDC 21 is stopped, the CPU 20 stops power supply by the power control section 215 to the hardware components (R/W-related circuits) relating to the disk access until space is caused in the buffer memory 211, while the information of the sector to be read out next is retained in the HDC 21 (the disk control section 214 in HDC 21). The CPU 20 is thus set in the standby state (step A1).

If the preread cache is executed, a new read command is then issued from the host. If the sector requested by the read command has made a cache hit, that is, if this sector agrees with the sector number of the data preread on the buffer memory 211, the HDC 21 starts transfer of data to the host through the buffer control section 213 and host I/F control section 212 within in the HDC 21, without intervention of the CPU 20.

If the data of one sector or more has been read out from the buffer memory 211 by the HDC 21 and completely transferred to the host, the area on the buffer memory 211, from which the transferred data has been read out, becomes an "empty" area capable of storing new data. If space is caused in the buffer memory 211 (the read-data buffer area in the buffer memory 211) (step A2), the buffer control section 213 within the HDC 21 detects this state and produces a corresponding detection signal (step A3). This detection signal is delivered to the interrupt input terminal of the CPU 20 as an interrupt signal to the CPU 20. A description will be given later of the method in which the buffer control section 213 within the HDC 21 detects the occurrence of space in the buffer memory 211 (the read-data buffer area of buffer memory 211).

If the CPU 20 receives from the buffer control section 213 the interrupt signal indicating the occurrence of space in the buffer memory 211, the CPU 20 controls the power control section 215 and resumes power supply to the hardware components relating to the disk access, power to which has been halted, that is, to the R/W circuit 18 and the disk control section 214 within the HDC 21, other than the registers which have been already powered (step A4). At this time, information of the sector to be read next has already been set in the register provided within the disk control section 214 within HDC 21. Accordingly, if the head 12 reaches the target sector D subsequently, the read-out by the disk control section 214 within HDC 21 is resumed (step A5). If the position of the head 12 at the time the power supply has been resumed is far from the target sector D (e.g. a position just beyond the target sector), the CPU 20 instructs once again the power control section 215 to stop power supply to the hardware components relating to the disk access, and waits once again until the head 12 reaches a point immediately before the target sector D.

By virtue of the above operation after the preread cache, power consumption of the hardware components (R/W-related circuits) relating to the disk access during interruption of preread can be reduced to zero. Moreover, access can be started from the target sector in a shortest time after space is created in the buffer memory 211.

The operation in the case where the read command was received from the host, that is, the operation at the read time (disk read-out time), has been described. The operation in the case where the write command was received from the host, that is, the operation at the write time (disk write time), is performed similarly with the operation at the read time, except that the operation flow at the read time is reversed.

Figure 6:
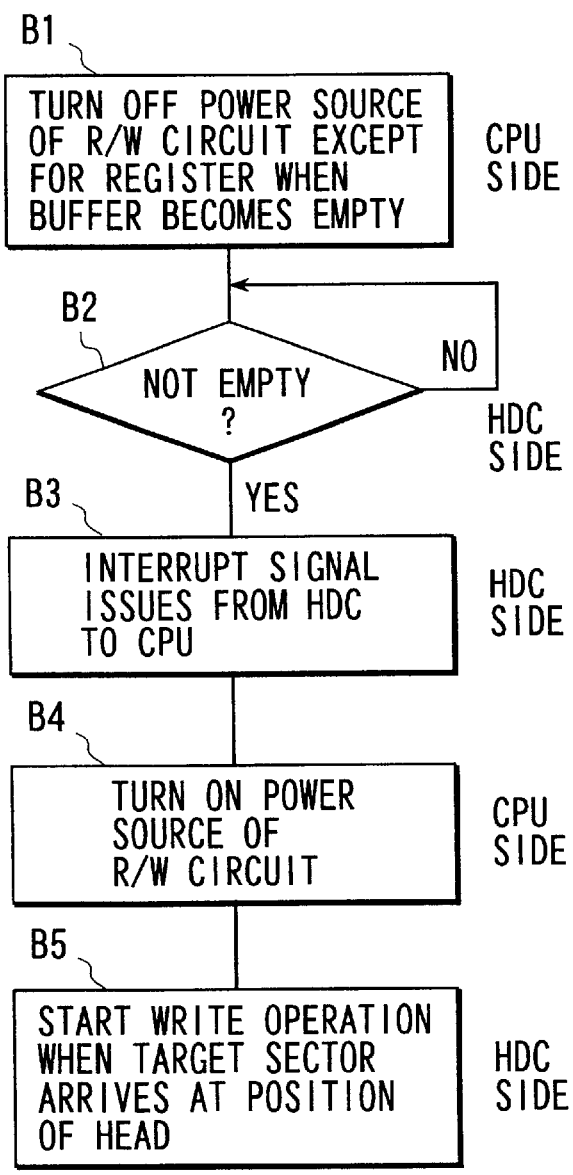
FIG. 6 is a flow chart illustrating a write opera tion in the first embodiment.

The operation at the write time will now be described with reference to the flow chart of FIG. 6, mainly with respect to the points at which the write-time operation differs from the read-time operation.

In the write operation, power supply to the hardware components (R/W-related circuits) relating to the disk access is stopped after the data, which was transferred from the host and stored in the write-data buffer area defined in the buffer memory 211, has been written in the disk 11 (successively from the target sector), that is, after the buffer memory 211 has become empty.

This situation is created after the data transfer from the host is stopped and the write of data already transferred is completed, or all data requested by the write command from the host has been written in the disk 11. The reason why the situation after the completion of the write command is considered is that when data to be written next is located immediately after the last written data, the setting for disk access is made to remain the same as that at the write end time so that data write can be started immediately without consuming time for interpretation of commands and setting various ICs.

In the write operation, if the buffer memory 211 becomes empty, the CPU 20 stops power supply to the hardware components relating to disk access and waits, while sector information to be written next is retained in the register provided in the disk control section 214 in the HDC 21 (step B1).

If a new write command is issued from the host and the buffer control section 213 in the HDC 21 receives one sector or more of data transferred from the host via the host I/F control section 212 and stores it in the buffer memory 211, the buffer memory 211 (the write data buffer area in the memory 211) becomes "not empty." If the buffer memory 211 has become not empty, the buffer control section 213 in the HDC 21 issues an interrupt signal 204 to the CPU 20 (steps B2 and B3). A method for detecting the state in which the buffer memory 211 (the write-data buffer area of memory 211) has become not empty will be described later.

If the CPU 20 receives the interrupt signal 204 from the buffer control section 213, the CPU 20 determines that the interrupt signal 204 indicates that the buffer memory 211 has become not empty, in the case of the write operation as in the present embodiment. The CPU 20 thus controls the power control section 215 and resumes power supply to the hardware components relating to the disk access, power to which has been halted, that is, to the R/W circuit 18 and the disk control section 214 within the HDC 21, other than the registers which have been already powered (step B4). At this time, information of the sector to be read next has already been set in the register provided within the disk control section 214 within HDC 21. Accordingly, if the head 12 reaches the target sector subsequently, the write by the disk control section 214 within HDC 21 is resumed (step B5). If the position of the head 12 at the time the power supply has been resumed is far from the target sector (e.g. a position just beyond the target sector), the CPU 20 instructs once again the power control section 215 to stop power supply to the hardware components relating to the disk access, and waits once again until the head 12 reaches a point immediately before the target sector.

By virtue of the above write operation, like the read operation, power consumption by the hardware relating to disk access can be reduced to zero at the time of stop of transfer to the host during the write operation or after the end of the write operation. In addition, like the read operation, the target sector can be accessed in a shortest time after the buffer memory 211 has become not empty.

Figure 7:
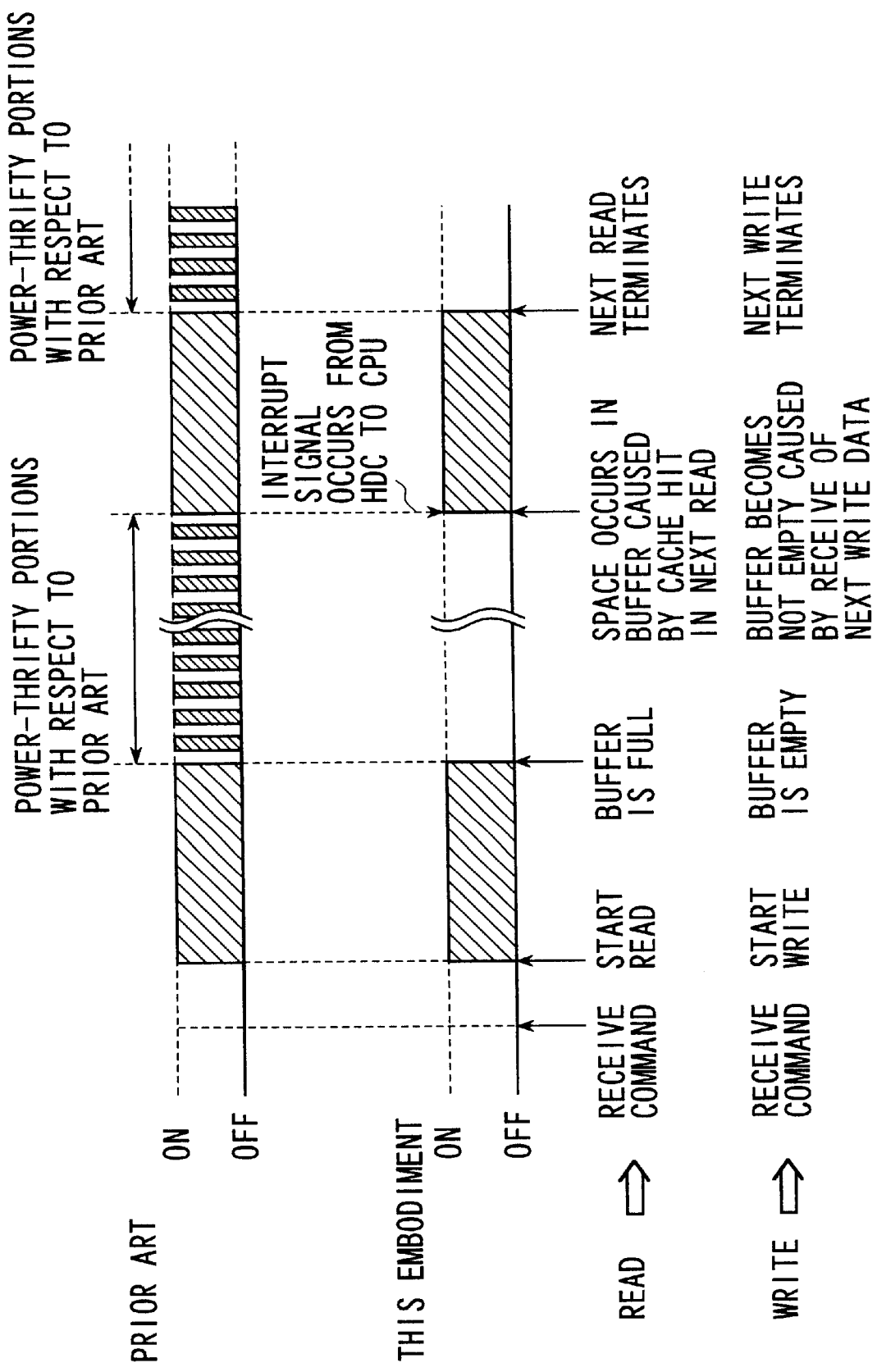
FIG. 7 shows differences in effect regarding power saving between the present embodiment and the prior art in a read mode and a write mode.

FIG. 7 illustrates differences in advantage on power saving between the present embodiment and the prior art, while showing the read-time operation and the write-time operation.

As is clear from FIG. 7, in the present embodiment, power consumption in the command wait state, in particular, after execution of the read command, can be reduced.

Three methods a1, b1 and c1 for detecting the "empty" state of the buffer memory 211 (the read-data buffer area in the memory 211) in the above-described read operation and three methods a2, b2 and c2 for detecting the "not empty" state of the buffer memory 211 (the write-data buffer area in the memory 211) in the write operation will now be described with reference to FIGS. 8 to 20. The methods a1 and a2, methods b1 and b2 and methods c1 and c2 are applied to the same HDD.

At first the methods a1 and a2 will now be described with reference to FIGS. 8A to BC and 9 to 12.

Figure 8A:
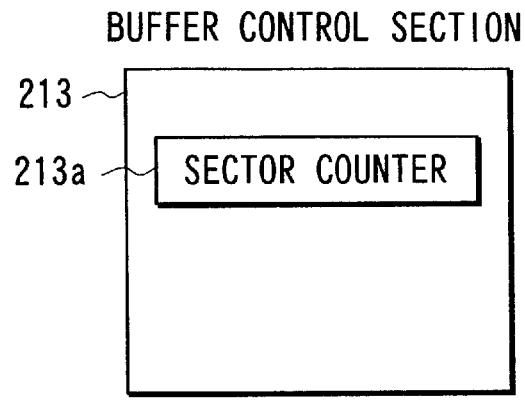
FIG. 8A shows a counter within a buffer control section 213 applicable to the present embodiment.
Figure 9:
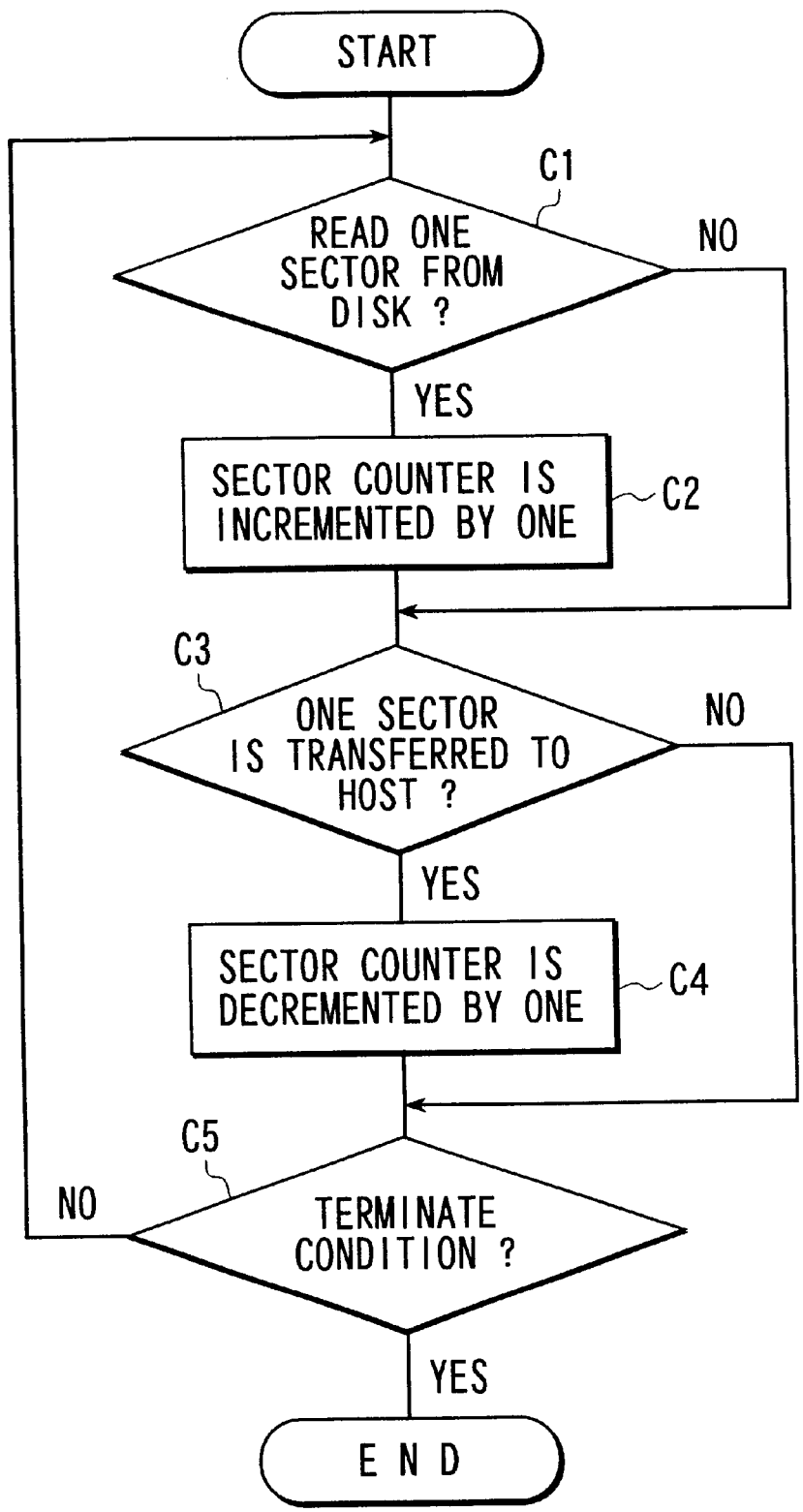
FIG. 9 is a flow chart illustrating a sector counter control operation in a case where a method a1 is applied to the read operation in the present embodiment.
Figure 10:
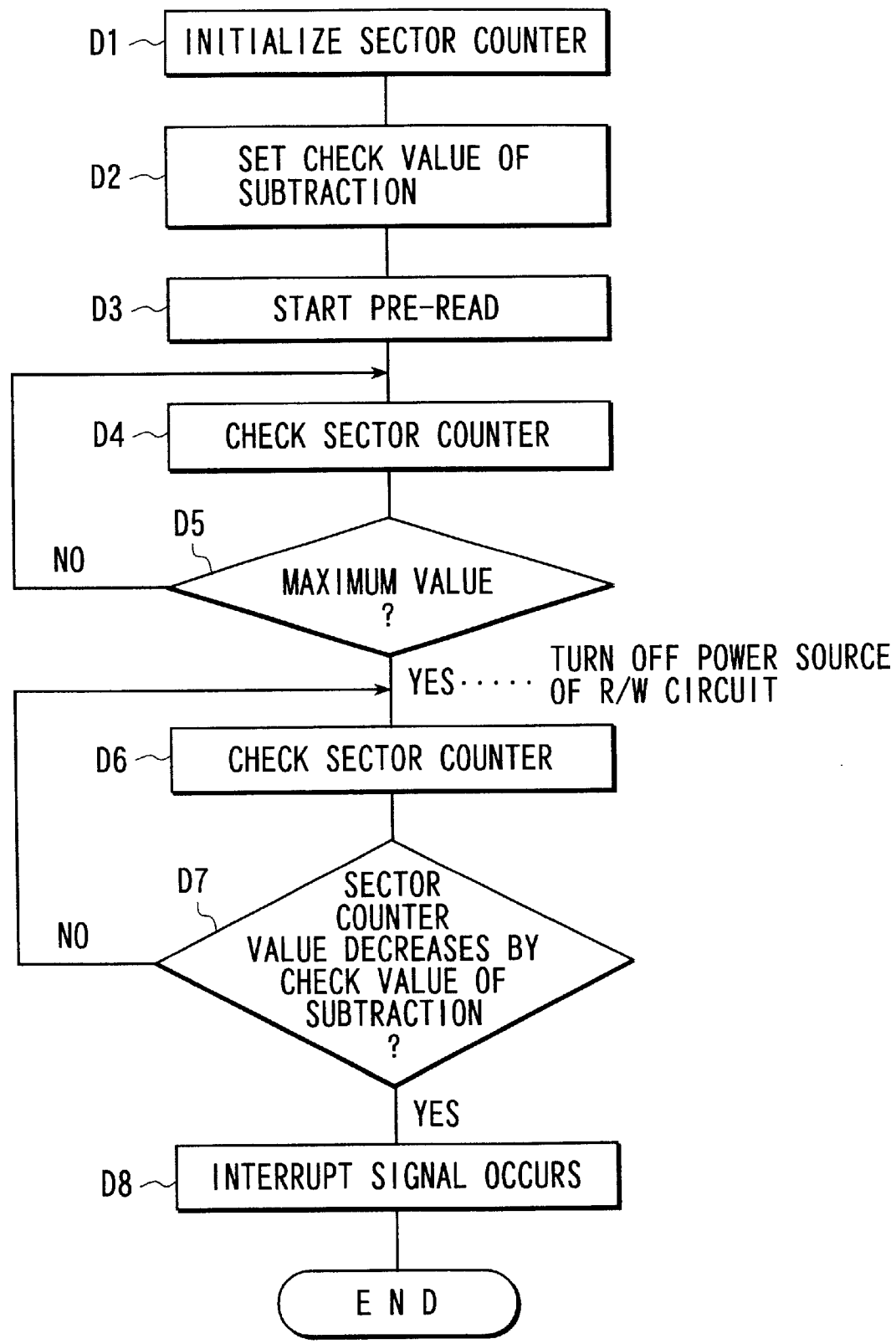
FIG. 10 is a flow chart illustrating the operation of the buffer control section 213 in the read mode in method a1.

(A-0) Counter Structure in Buffer Control Section 213 In a case where methods a1 and a2 are applied to the HDD of FIG. 4, a sector counter 213a is provided in the buffer control section 213 within HDC 21, for example, as shown in FIG. 8A. At the time of read (disk read), the sector counter 213a, as illustrated in the flow chart of FIG. 9, is incremented by 1 each time one-sector data is read out from the disk 11 and stored in the buffer memory 211 (steps C1 and C2). The sector counter 213a is decremented by 1 each time one-sector data is read out from the buffer memory 211 and transferred to the host (steps C3 and C4). These operations are repeated until the conditions for the end of the read operation are met (step C5).

Figure 11:
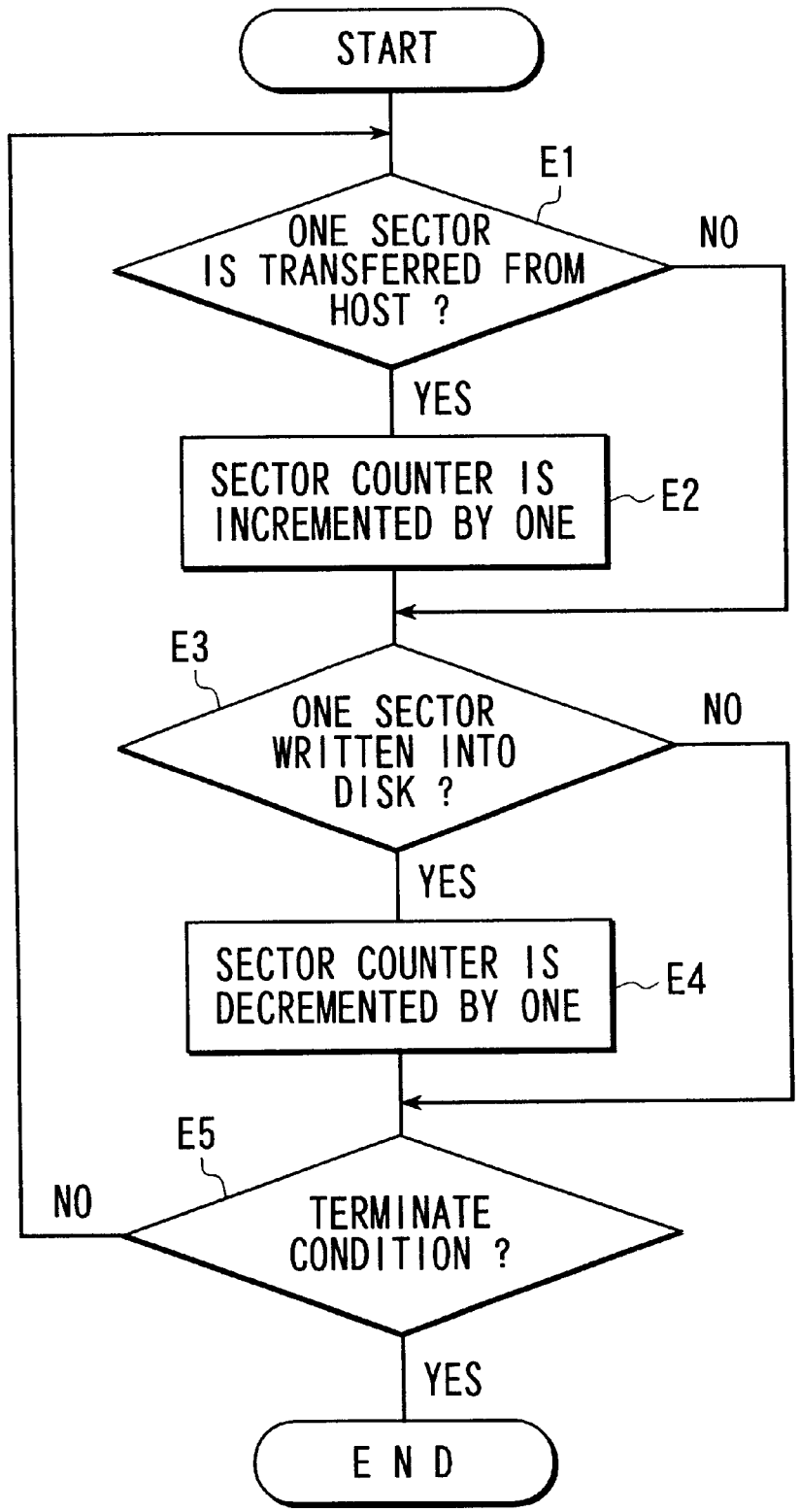
FIG. 11 is a flow chart illustrating a sector counter control operation in a case where a method a2 is applied to the write operation in the present embodiment.

At the time of write (disk write), the sector counter 213a is incremented by 1 each time one-sector data is transferred from the host and stored in the buffer memory 211, as shown in the flow chart of FIG. 11 (steps E1 and E2). The sector counter 213a is decremented by 1 each time one-sector data is read out from the buffer memory 211 and written in the disk 11 (steps E3 and E4). These operations are repeated until the conditions for the end of the write operation are met (step E5).

(A-1) Operation of Buffer Control Section 213 by Read-Time Method a1

When the read command from the host is executed, the buffer control section 213 initializes the sector counter 213a (to zero) and sets a subtraction check value (to be described later) in the register 213A (steps D1 and D2).

Then in the HDC 21, the read-out of the data, which was requested by the read command from the host, from the disk 11 to the buffer memory 211, and the transfer of data from the buffer memory 211 to the host are executed in parallel. If the transfer of the data requested by the read command to the host is completed, the preread is started (step D3).

In this state, the buffer control section 213 repeats the operation for checking the sector counter 213a until the counter value reaches a maximum (steps D4 and D5). If the counter value of the sector counter 213a has reached the maximum, that is, if the counter value of sector counter 213a has reached a value (maximum) obtained by dividing the capacity (size) of the read-data buffer region defined in the buffer memory 211 by a data length of one sector, the buffer control section 213 determines that the buffer memory 211 (the read-data buffer area in memory 211) has been filled, and stops the preread.

If the buffer memory 211 is filled and the preread is stopped, the CPU 20 stops power supply to the hardware components relating to disk access through the power control section 215.

On the other hand, the buffer control section 213 repeats the operation of checking the sector counter 213a until the counter value has decreased from the maximum by a degree corresponding to the subtraction check value (steps D6 and D7). If the value of the sector counter 213a decreased from the maximum by a degree corresponding to the subtraction check value (e.g. 1), that is, if the value of the sector counter 213a once became the maximum and then fell from the maximum (by a degree corresponding to a preset subtraction check value), the buffer control section 213 determines that the buffer memory 211 (the readdata buffer area in memory 211) was once filled and then space was caused therein and issues the interrupt signal 204 to the CPU 20 (step D8).

(A-2) Operation of Buffer Control Section 213 by Write-Time Method a2

Figure 12:
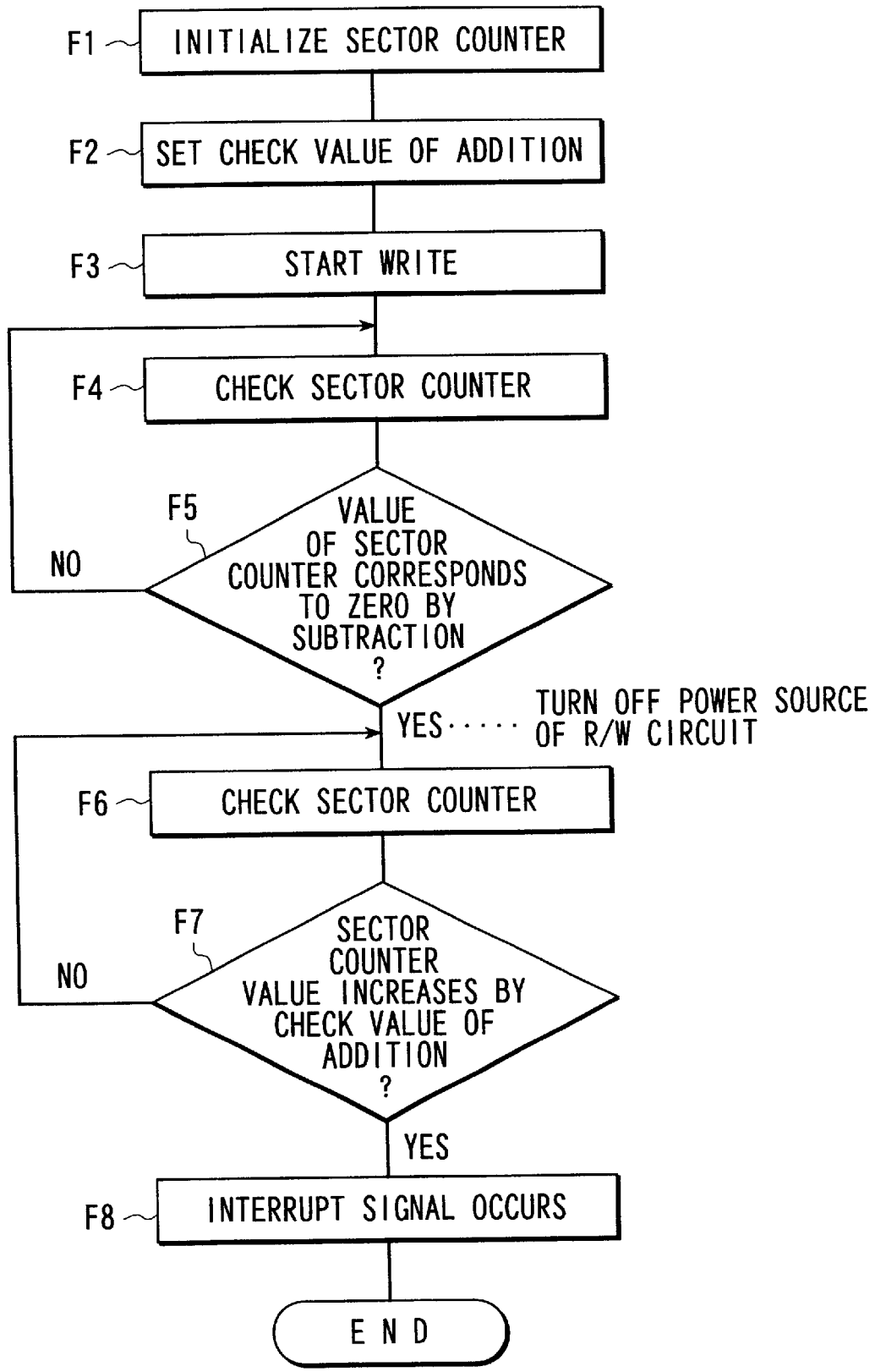
FIG. 12 is a flow chart illustrating the operation of the buffer control section 213 in the write mode in method a2.

When the write command from the host is executed, the buffer control section 213 initializes the sector counter 213a (to zero), as shown in FIG. 12, and sets an addition check value (to be described later) in the register 213A (steps F1 and F2).

Then in the HDC 21, the transfer (and write) of data requested by the write command from the host into the buffer memory 211 is started (step F3). In this case, the read-out of data from the buffer memory 211 and the write of data to the disk 11 are also started.

In this state, the buffer control section 213 repeats the operation for checking the sector counter 213a until the counter value is decreased to zero by decrement operations (steps F4 and F5). If the counter value of the sector counter 213a has decreased to zero by the decrement operations, the buffer control section 213 determines that the buffer memory 211 (the write-data buffer area in memory 211) has been emptied, and the control goes to step F6.

If the buffer memory 211 is emptied at the time of write, the CPU 20 stops power supply to the hardware components relating to disk access through the power control section 215, while sector information to be written next is retained in the disk control section 214 in the HDC 21.

On the other hand, the buffer control section 213 repeats the operation of checking the sector counter 213a until the counter value has increased from zero by a degree corresponding to the addition check value (steps F6 and F7). If the value of the sector counter 213a increased from zero by a degree corresponding to the addition check value (e.g. 1), that is, if the value of the sector counter 213a once became zero by decrement operations and then increased from zero (by a degree corresponding to a preset addition check value), the buffer control section 213 determines that the buffer memory 211 (the write-data buffer area in memory 211) was once emptied and then became "not empty" and issues the interrupt signal 204 to the CPU 20 (step F8).

The methods b1 and b2 will now be described with reference to FIG. 8 and 13 to 16.

(B-0) Pointer Structure in Buffer Control Section 213

Figure 8B:
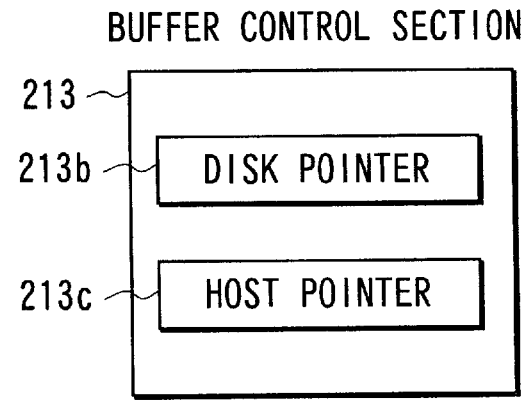
FIG. 8B shows pointers within the buffer control section 213 applicable to the present embodiment.

In a case where methods b1 and b2 are applied to the HDD shown in FIG. 4, a disk pointer 213b is provided in the buffer control section 213 in HDC 21, for example, as shown in FIG. 8B. The disk pointer 213b retains a data address on the buffer memory 211, at which the data read out from the disk 11 is to be stored, i.e. a read destination address (at the time of read) from the disk 11, or a data address at which data to be written on the disk 11 is stored, i.e. an originating-side address (at the time of write) for write to the disk 11. In addition, a host pointer 213c is provided in the buffer control section 213. The host pointer 213c retains a data address on the buffer memory 211, at which the data to be transferred to the host is stored, i.e. an originating-side address (at the time of read) for data transfer to the host, or a data address at which data transferred from the host is stored, i.e. a transfer destination address (at the time of write) for transfer of data from the host.

Figure 13:
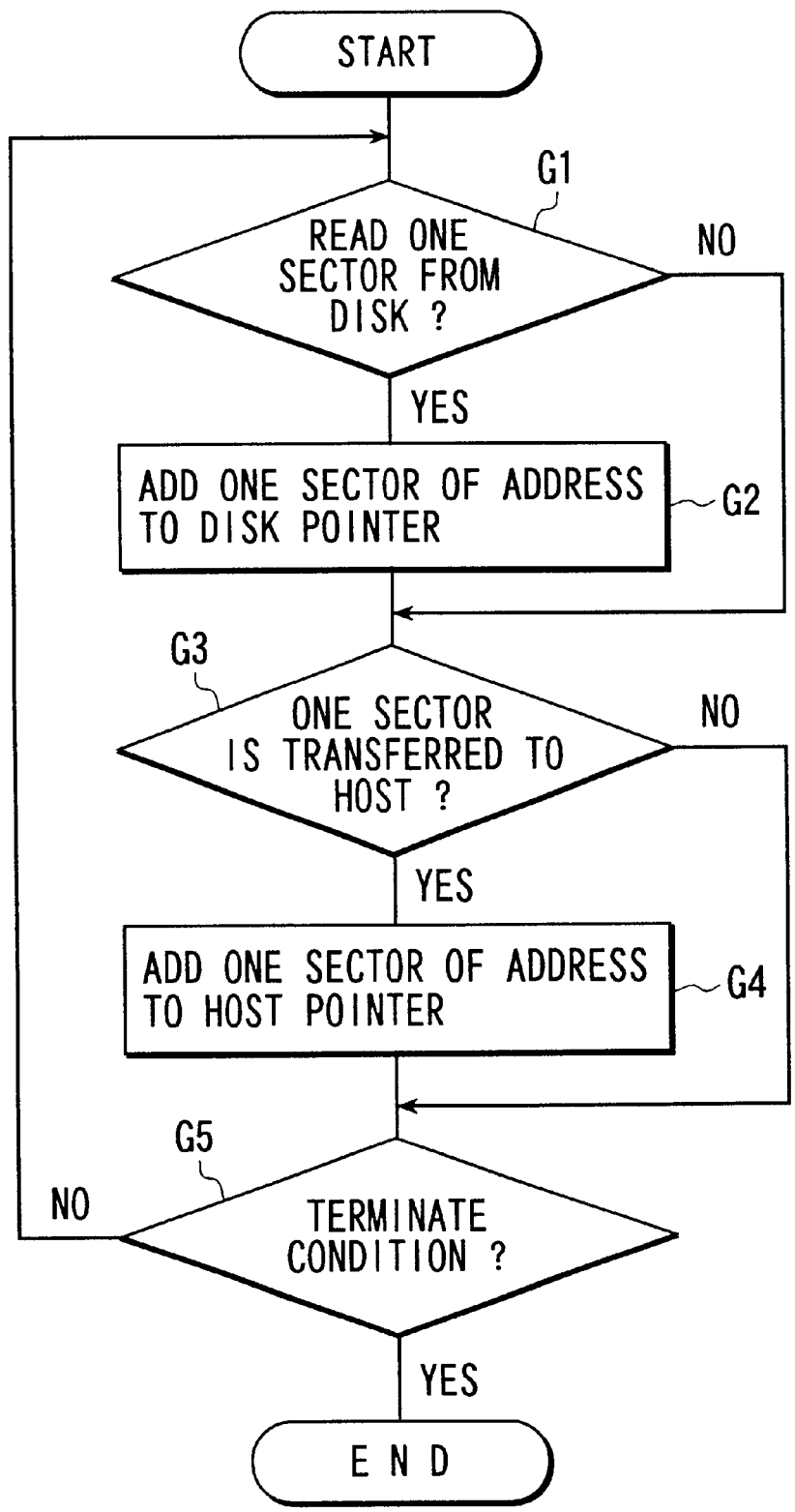
FIG. 13 is a flow chart illustrating a pointer control operation in a case where a method b1 is applied to the read operation in the present embodiment.
Figure 14:
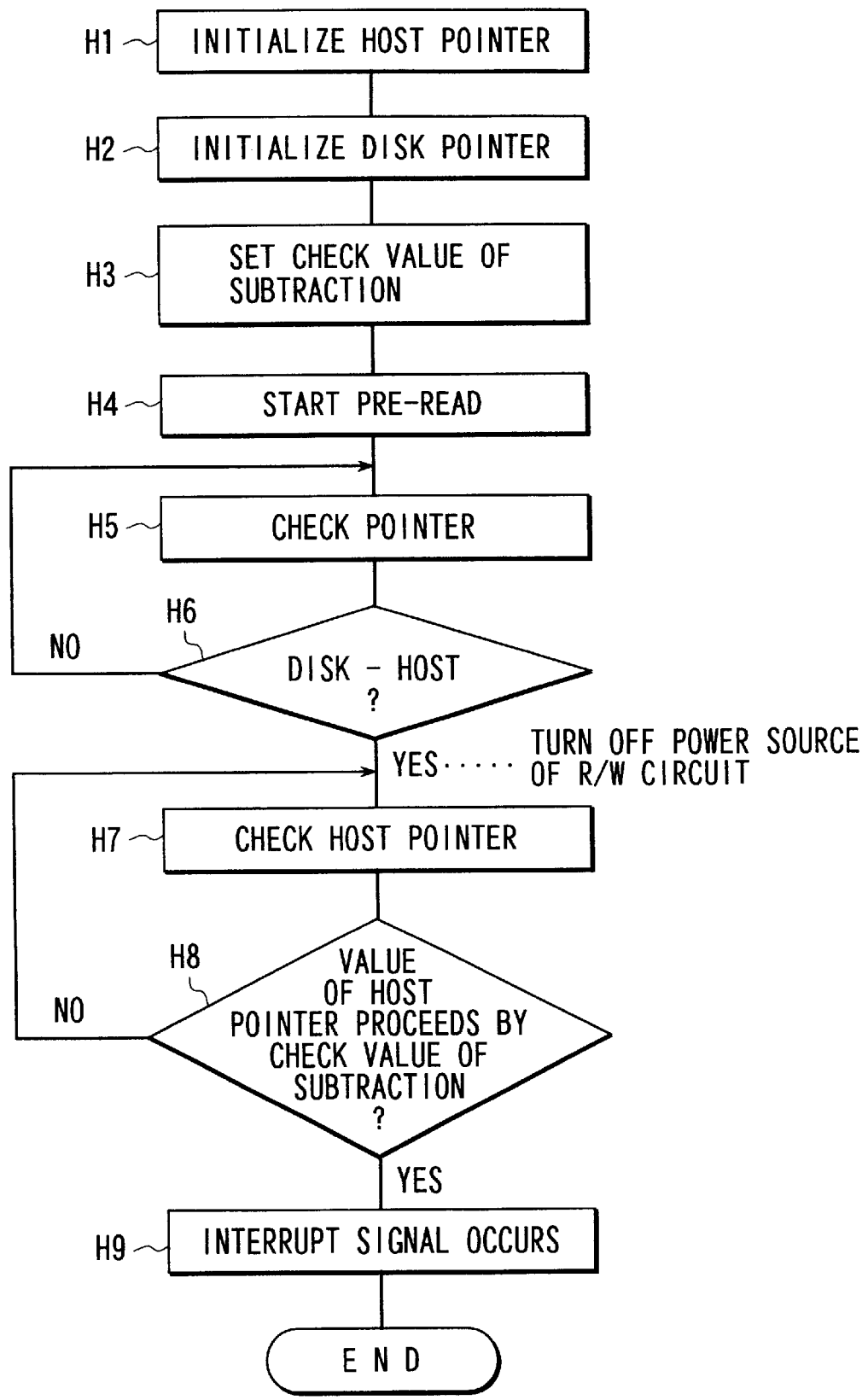
FIG. 14 is a flow chart illustrating the operation of the buffer control section 213 in the read mode in method b1.

At the time of read from the disk 11, as shown in the flow chart of FIG. 13, a one-sector address is added to the disk pointer 213b each time one-sector data is read out from the disk 11 and stored in the buffer memory 211 (steps G1 and G2). In addition, a one-sector address is added to the host pointer 213c each time one-sector data is read out from the buffer memory 211 and transferred to the host (steps G3 and G4). These operations are repeated until the conditions for the end of the read operation are met (step G5).

Figure 15:
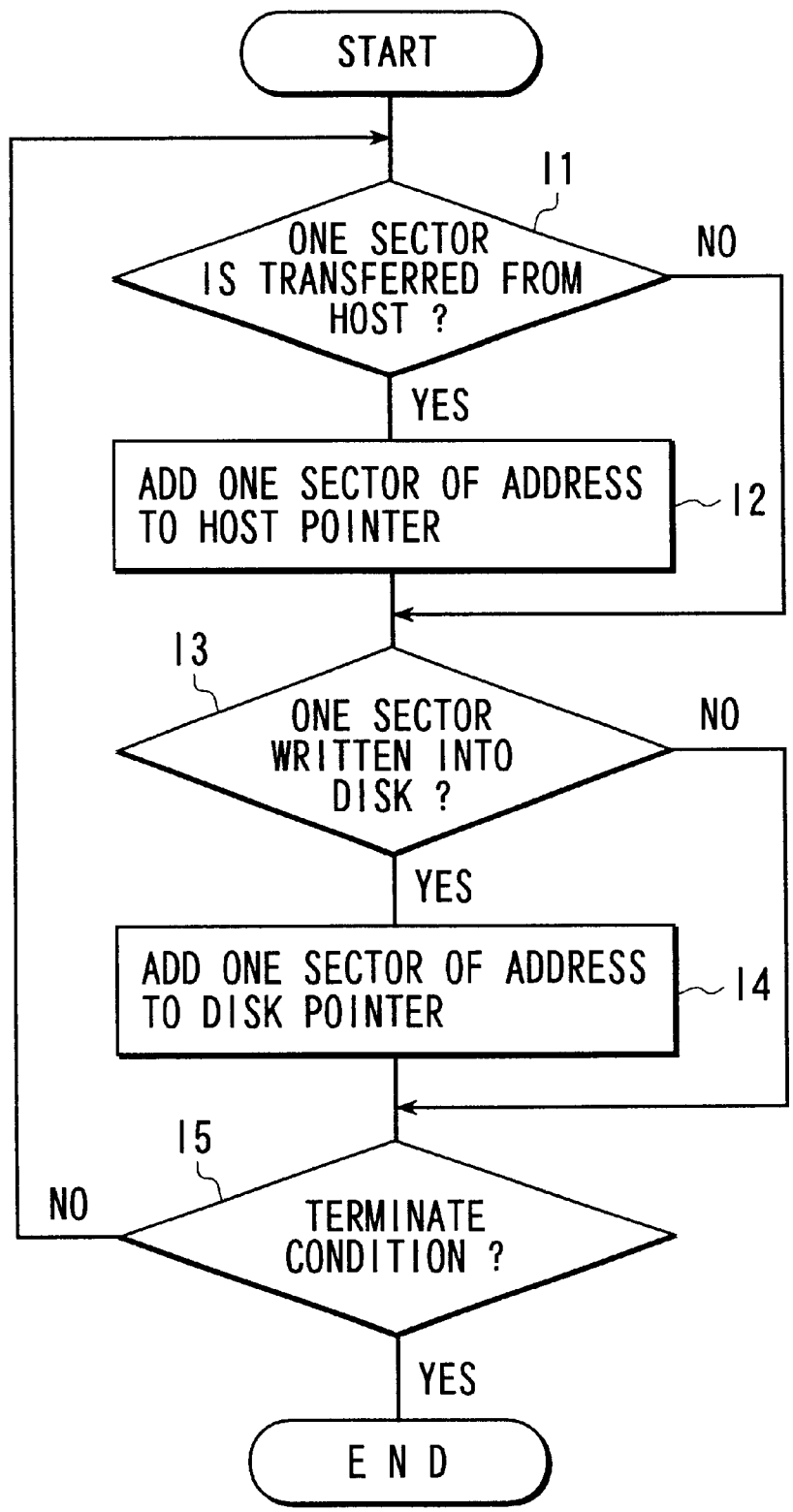
FIG. 15 is a flow chart illustrating a pointer control operation in a case where a method b2 is applied to the write operation in the present embodiment.
Figure 16:
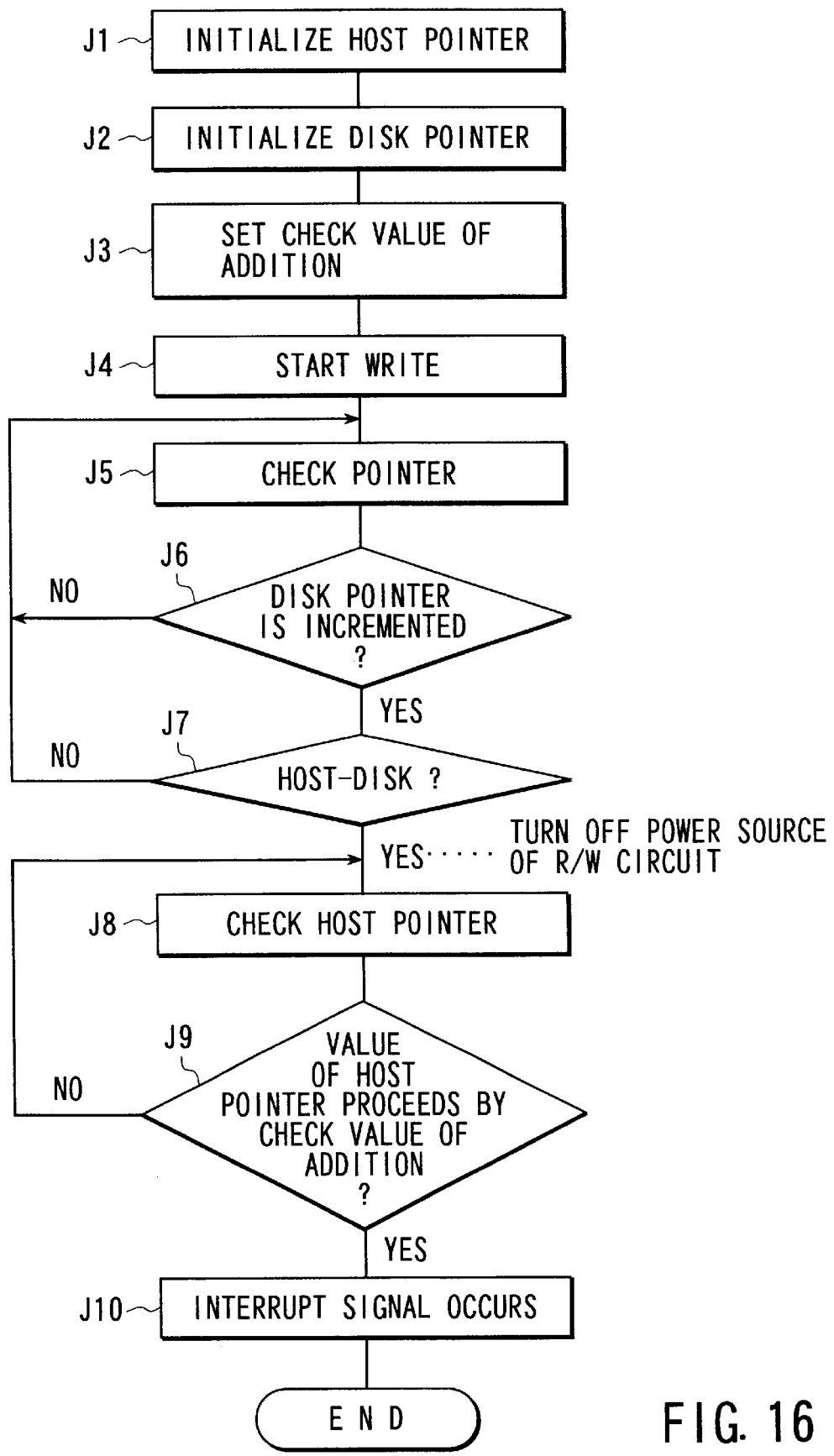
FIG. 16 is a flow chart illustrating the operation of the buffer control section 213 in the write mode in method b2.

On the other hand, at the time of write of data on the disk 11, as shown in the flow chart of FIG. 15, a one-sector address is added to the host pointer 213c each time one-sector data is transferred from the host and stored in the buffer memory 211 (steps I1 and I2). In addition, a one-sector address is added to the disk pointer 213b each time one-sector data is read out from the buffer memory 211 and written on the disk 11 (steps I3 and I4). These operations are repeated until the conditions for the end of the write operation are met (step I5). Like the prior art, the buffer memory 211 (buffer area of memory 211) is used in an annular shape. Thus, in a case where the pointer 213b, 213c indicates an address just in a boundary position, a process for setting initial values are required in addition to the addition process of step I3, I4.

(B-1) Operation of Buffer Control Section 213 by Read-Time Method b1

When the read command from the host is executed, the buffer control section 213 initializes the disk pointer 213b and host pointer 213c, and sets a subtraction check value (to be described later) in the register 213A (steps H1 to H3).

Then in the HDC 21, the read-out of the data, which was requested by the read command from the host, from the disk 11 to the buffer memory 211, and the transfer of data from the buffer memory 211 to the host are executed in parallel. If the transfer of the data requested by the read command to the host is completed, the preread is started (step H3).

The buffer area of buffer memory 211 (the read-data buffer area in this case) is used in an annular shape, as was described in connection with the prior art. Thus, the "full" state of the buffer memory 211 (the buffer region of memory 211) is detected by the fact that the disk pointer 213b has once moved round and caught up with the host pointer 213c.

Accordingly, in the method b1, after the preread is started, the buffer control section 213 in HDC detects that the disk pointer 213b has caught up with the host pointer 213c, i.e. that the value of the disk pointer 213b has become equal to that of the host pointer 213c by the addition operation in previous step G2 (steps H5 and H6). Thereby, the full state of the buffer memory 211 (the read-data buffer area of memory 211) is detected.

If the buffer control section 213 detects this state, it stops the preread. If the preread by the buffer control section 213 is stopped, the CPU 20 stops power supply to the hardware components (except the register section) relating to the disk access through the power control section 215.

If the buffer control section 213 detects the full state of the buffer memory 211 (the read-data buffer area in memory 211) and stops the preread, the buffer control section 213 repeats the operation of checking the host pointer 213c until the pointer 213c advances by a preset number of sectors which is set in advance by the pointer 213c (i.e. by a distance represented by the subtraction check value corresponding to the preset number of sectors) (steps H7 and H8). The fact that the host pointer 213c has advanced by a distance represented by the subtraction check value, that is, the value of the disk pointer 213b was once equal to that of the host pointer 213c and then the host pointer 213c has advanced by a distance represented by the subtraction check value, means that the disk pointer 213b has caught up with the host pointer 213c and then the host pointer 213c has advanced by a preset number of sectors. In this case, the buffer control section 213 determines that after the buffer memory 211 was filled, the transfer of data from the buffer memory 211 to the host was continued and space corresponding to a predetermined number of sectors has been caused. The buffer control section 213 thus issues the interrupt signal 204 to the CPU 20 (step H9).

(B-2) Operation of Buffer Control Section 213 by Write-Time Method b2

When the write command from the host is executed, the buffer control section 213 initializes the disk pointer 213b and host pointer 213c, and sets an addition check value (to be described later) in the register 213A (steps J1 to J3).

Then in the HDC 21, the transfer and write of the data, which was requested by the write command from the host, to the buffer memory 211 is started (step J4). In this case, the data read from the buffer memory 211 and the data write to the disk 11 are also started.

In this state the buffer control section 213 repeats the operation of checking the disk pointer 213b and host pointer 213c until the value of the disk pointer 213b becomes equal to that of the host pointer 213c due to the addition operation in previous step I4 (steps J5 to J7). If the value of the disk pointer 213b has become equal to that of the host pointer 213c by the addition, that is, if the data write from the buffer memory 211 to the disk 11 has been continued and the disk pointer 213b has caught up with the host pointer 213c, the buffer control section 213 determines that the buffer memory 211 (the write-data buffer area in memory 211) has become empty, and the control goes to step J8.

If the buffer memory 211 has become empty at the time of write, the CPU 20 stops power supply to the hardware components relating to the disk access through the power control section 215, while sector information to be written next is retained in the disk control section 214 in the HDC 21.

On the other hand, the buffer control section 213 repeats the operation of checking the host pointer 213c until the pointer 213c advances by a preset number of sectors (i.e. by a distance represented by the addition check value corresponding to the preset number of sectors) (steps J8 and J9). If the host pointer 213c has advanced by a distance corresponding to the addition check value, that is, if the disk pointer 213b caught up with the host pointer 213c by the addition (the write from the buffer memory 211 to the disk 11) and then the host pointer 213c has advanced by a preset number of sectors (i.e. if a preset number of sectors have been transferred from the host to the buffer memory 211), the buffer control section 213 determines that the buffer memory 211 was once emptied and has then become not empty. Thus, the buffer control section 213 issues the interrupt signal 204 to the CPU 20 (step J10).

The methods c1 and c2 will now be described with reference to FIGS. 8 and 17 to 20.

(C-0) Counter Structure in Buffer Control Section 213

Figure 8C:
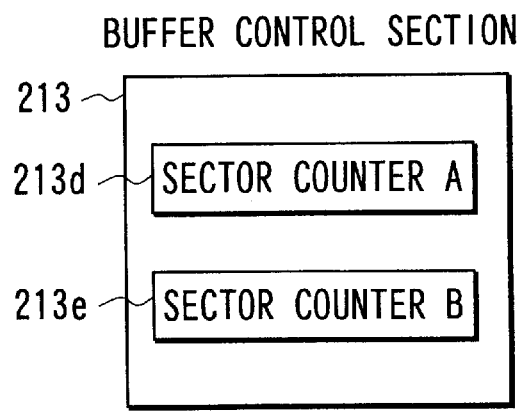
FIG. 8C shows counters within the buffer control section 213 applicable to the present embodiment.

In a case where methods c1 and c2 are applied to the HDD shown in FIG. 4, a sector counter (sector counter A) 213d is provided in the buffer control section 213d in HDC 21, for example, as shown in FIG. 8C. The sector counter 213d counts the number of sectors of data to be input/output between the HDC 21 and buffer memory 211. In addition, a sector counter (sector counter B) 213e is provided in the buffer control section 213. The sector counter 213e counts the number of sectors of data to be input/output between the host and buffer memory 211.

Figure 17:
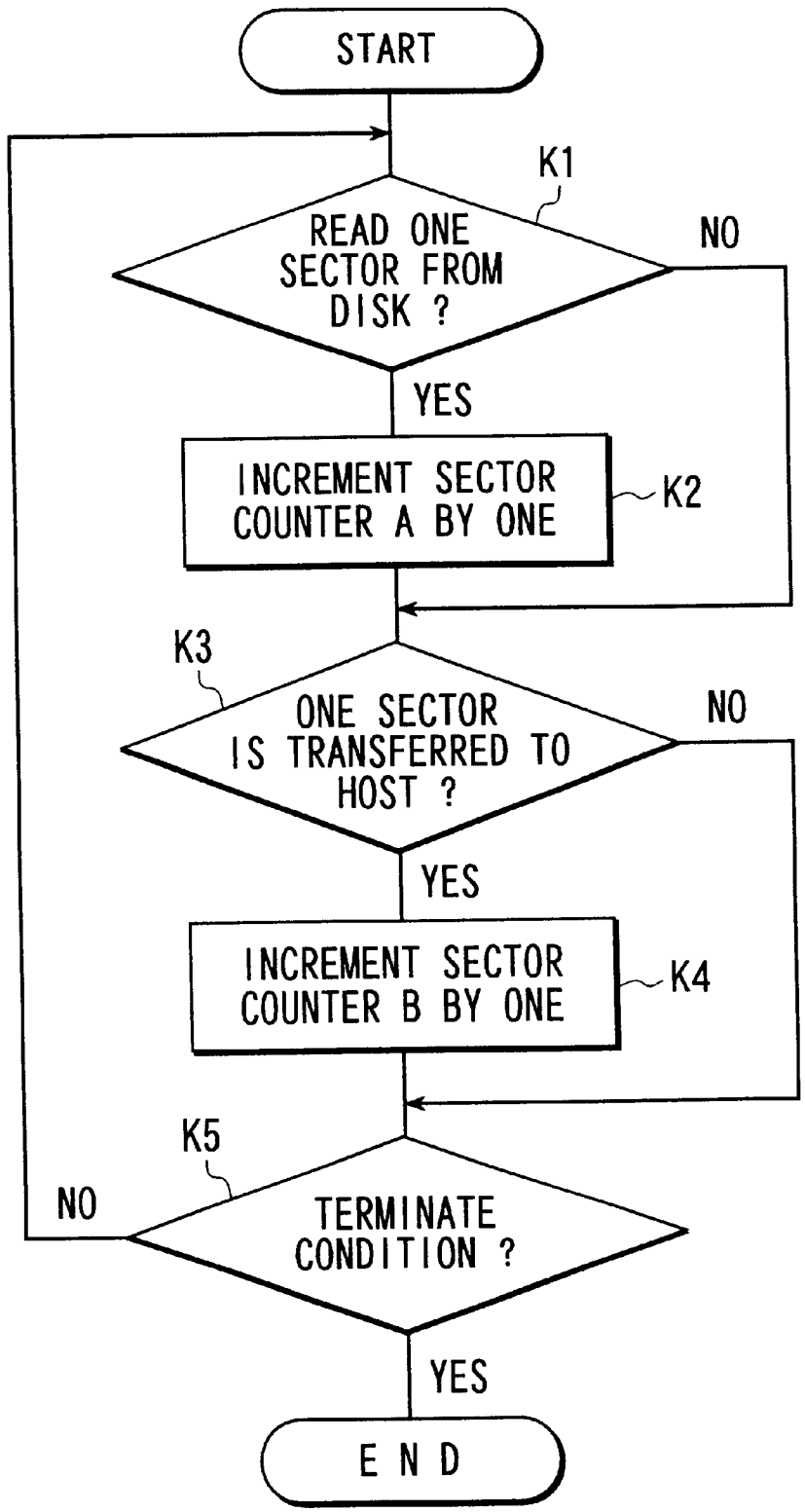
FIG. 17 is a flow chart illustrating a sector counter control operation in a case where a method c1 is applied to the read operation in the present embodiment.
Figure 18:
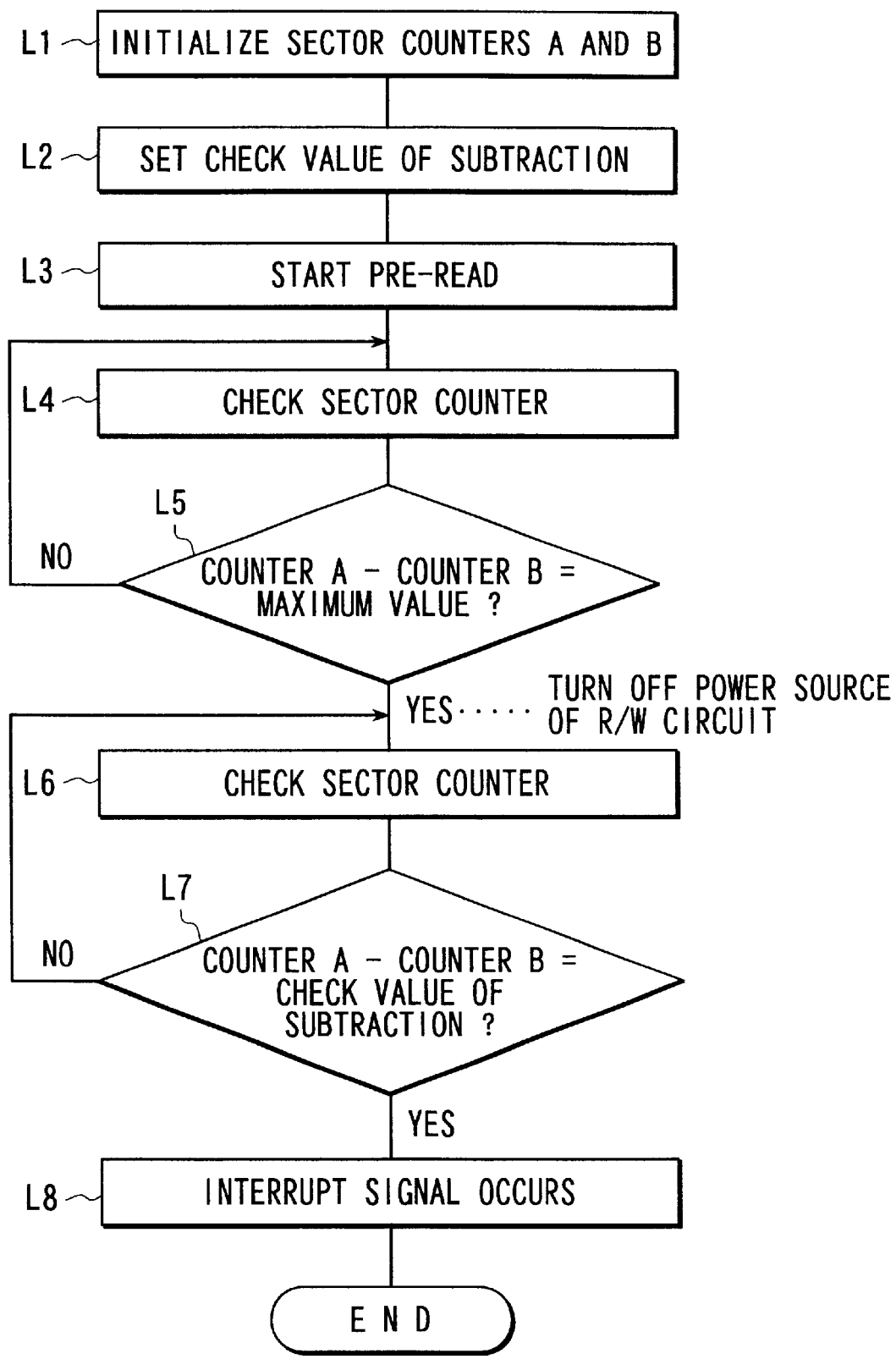
FIG. 18 is a flow chart illustrating the operation of the buffer control section 213 in the read mode in method c1.

At the time of read from the disk 11, as shown in the flow chart of FIG. 17, the sector counter A (213d) is incremented by 1 each time one-sector data is read out from the disk 11 and stored in the buffer memory 211 (steps K1 and K2). The sector counter B (213e) is incremented by 1 each time one-sector data is read out from the buffer memory 211 and transferred to the host (steps K3 and K4). These operations are repeated until the conditions for the end of the read operation are met (step K5).

Figure 19:
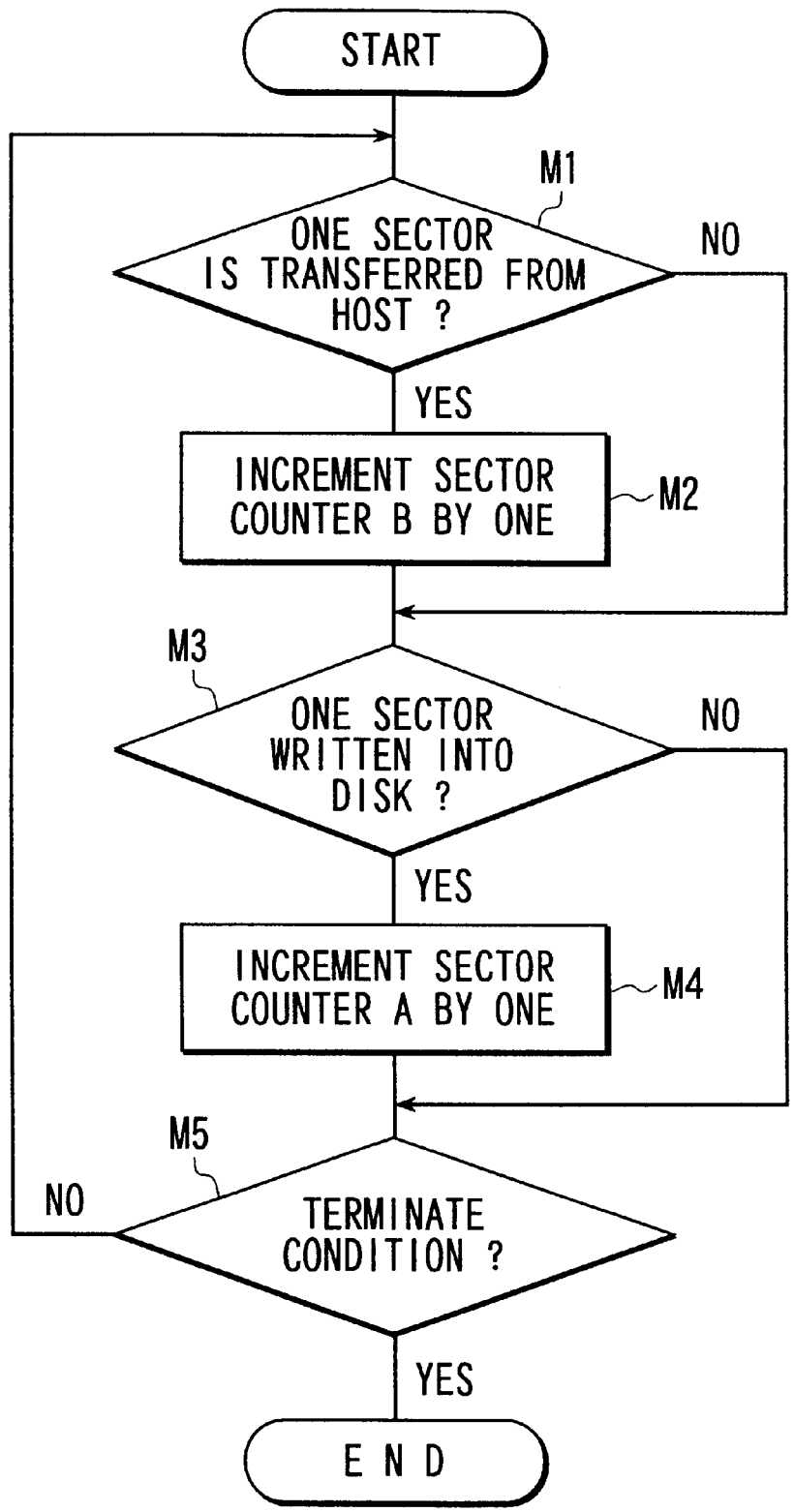
FIG. 19 is a flow chart illustrating a sector counter control operation in a case where a method c2 is applied to the write operation in the present embodiment.
Figure 20:
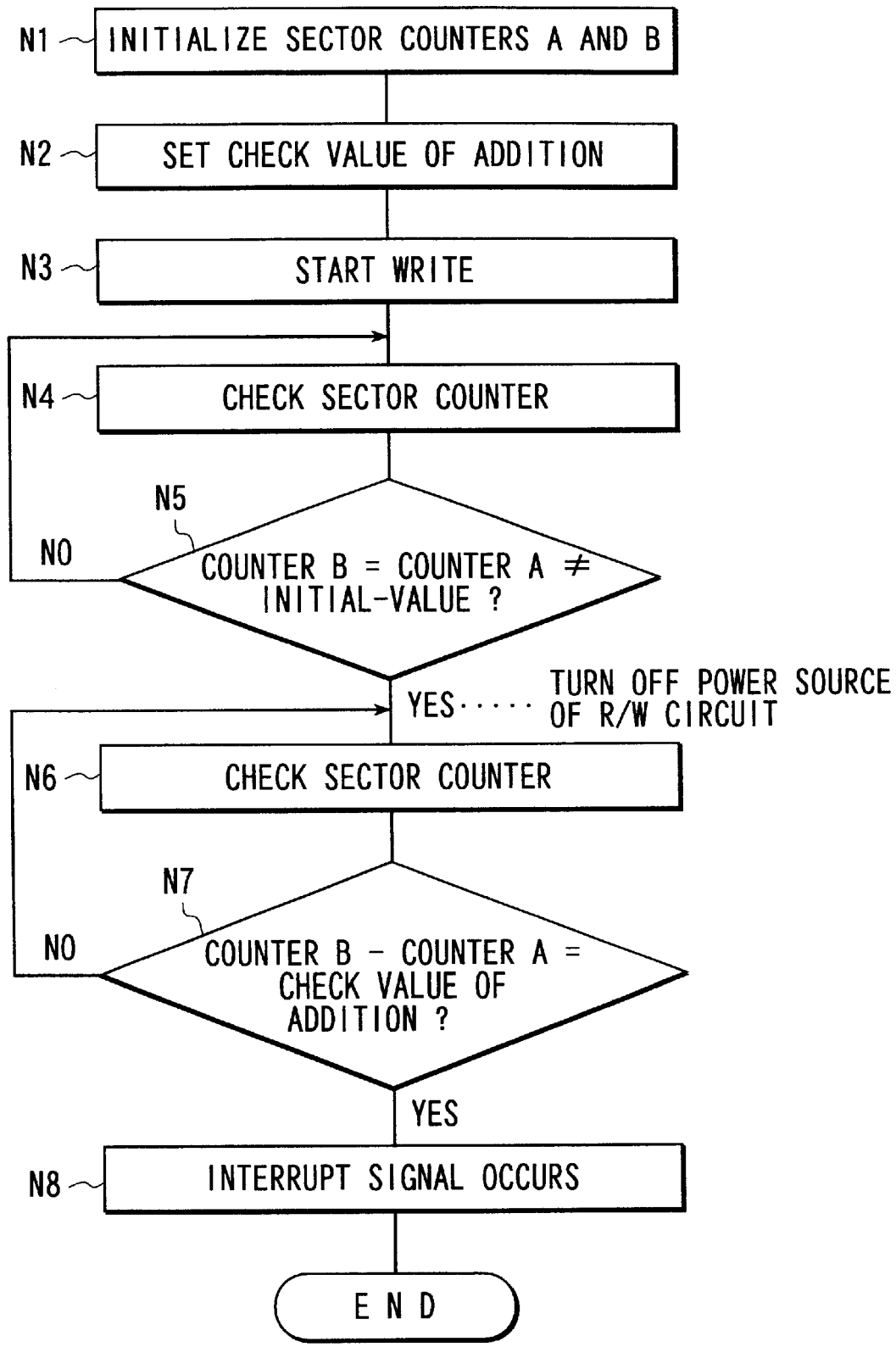
FIG. 20 is a flow chart illustrating the operation of the buffer control section 213 in the write mode in method c2.

On the other hand, at the time of write from the disk 11, as shown in the flow chart of FIG. 19, the sector counter B (213e) is incremented by 1 each time one-sector data is transferred from the host and stored in the buffer memory 211 (steps M1 and M2). The sector counter A (213d) is incremented by 1 each time onesector data is read out from the buffer memory 211 and written on the disk 11 (steps M3 and M4). These operations are repeated until the conditions for the end of the write operation are met (step M5).

(C-1) Operation of Buffer Control Section 213 by Read-Time Method c1

When the read command from the host is executed, the buffer control section 213 initializes the sector counters A (213d) and B (213e) (to zero) and sets a subtraction check value (to be described later) in the register 213A (steps L1 and L2).

Then in the HDC 21, the read-out of the data, which was requested by the read command from the host, from the disk 11 to the buffer memory 211, and the transfer of data from the buffer memory 211 to the host are executed in parallel. If the transfer of the data requested by the read command to the host is completed, the preread is started (step L3).

In this state, the buffer control section 213 repeats the operation for checking the sector counters A and B until a difference between the counter values of both counters reaches a maximum (steps L4 and L5). If the difference between the counter values of both counters A and B reaches a maximum, that is, if the difference in value between sector counters A and B has reached a value (maximum) obtained by dividing the capacity (size) of the read-data buffer region defined in the buffer memory 211 by a data length of one sector, the buffer control section 213 determines that the buffer memory 211 (the read-data buffer area in memory 211) has been filled, and stops the preread.

If the buffer memory 211 is filled and the preread is stopped, the CPU 20 stops power supply to the hardware components (except the register section) relating to disk access through the power control section 215.

On the other hand, the buffer control section 213 repeats the operation of checking the sector counters A and B until the difference between their counter values has decreased to a preset subtraction check value (steps L6 and L7). If the difference between the counter values of sector counters A and B decreased from the maximum to the subtraction check value (e.g. (maximum–)), that is, if the difference in value between sector counters A and B once became the maximum and then fell from the maximum (to the preset subtraction check value), the buffer control section 213 determines that the buffer memory 211 (the read-data buffer area in memory 211) was once filled and then space was caused therein and issues the interrupt signal 204 to the CPU 20 (step L8).

(C-2) Operation of Buffer Control Section 213 by Write-Time Method c2

When the write command from the host is executed, the buffer control section 213 initializes the sector counter 213a (to zero), as shown in FIG. 12, and sets an addition check value (to be described later) in the register 213A (steps F1 and F2).

Then in the HDC 21, the transfer (and write) of data requested by the write command from the host into the buffer memory 211 is started (step F3). In this case, the read-out of data from the buffer memory 211 and the write of data to the disk 11 are also started.

In this state, the buffer control section 213 repeats the operation for checking the sector counter 213a until the counter value is decreased to zero by decrement operations (steps F4 and F5). If the counter value of the sector counter 213a has decreased to zero by the decrement operations, the buffer control section 213 determines that the buffer memory 211 (the write-data buffer area in memory 211) has been emptied, and the control goes to step F6.

If the buffer memory 211 is emptied at the time of write, the CPU 20 stops power supply to the hardware components relating to disk access through the power control section 215, while sector information to be written next is retained in the disk control section 214 in the HDC 21.

On the other hand, the buffer control section 213 repeats the operation of checking the sector counter 213a until the counter value has increased from zero by a degree corresponding to the addition check value (steps F6 and F7). If the value of the sector counter 213a increased from zero by a degree corresponding to the addition check value (e.g. 1), that is, if the value of the sector counter 213a once became zero by decrement operations and then increased from zero (by a degree corresponding to a preset addition check value), the buffer control section 213 determines that the buffer memory 211 (the write-data buffer area in memory 211) was once emptied and then became "not empty" and issues the interrupt signal 204 to the CPU 20 (step F8).

The methods b1 and b2 will now be described with reference to FIG. 8 and 13 to 16.

(B-0) Pointer Structure in Buffer Control Section 213

In a case where methods b1 and b2 are applied to the HDD shown in FIG. 4, a disk pointer 213b is provided in the buffer control section 213 in HDC 21, for example, as shown in FIG. 8B. The disk pointer 213b retains a data address on the buffer memory 211, at which the data read out from the disk 11 is to be stored, i.e. a read destination address (at the time of read) from the disk 11, or a data address at which data to be written on the disk 11 is stored, i.e. an originating-side address (at the time of write) for write to the disk 11. In addition, a host pointer 213c is provided in the buffer control section 213. The host pointer 213c retains a data address on the buffer memory 211, at which the data to be transferred to the host is stored, i.e. an originating-side address (at the time of read) for data transfer to the host, or a data address at which data transferred from the host is stored, i.e. a transfer destination address (at the time of write) for transfer of data from the host.

At the time of read from the disk 11, as shown in the flow chart of FIG. 13, a one-sector address is added to the disk pointer 213b each time one-sector data is read out from the disk 11 and stored in the buffer memory 211 (steps G1 and G2). In addition, a one-sector address is added to the host pointer 213c each time one-sector data is read out from the buffer memory 211 and transferred to the host (steps G3 and G4). These operations are repeated until the conditions for the end of the read operation are met (step G5).

On the other hand, at the time of write of data on the disk 11, as shown in the flow chart of FIG. 15, a one-sector address is added to the host pointer 213c each time one-sector data is transferred from the host and stored in the buffer memory 211 (steps I1 and I2). In addition, a one-sector address is added to the disk pointer 213b each time one-sector data is read out from the buffer memory 211 and written on the disk 11 (steps I3 and I4). These operations are repeated until the conditions for the end of the write operation are met (step I5).

Like the prior art, the buffer memory 211 (buffer area of memory 211) is used in an annular shape. Thus, in a case where the pointer 213b, 213c indicates an address just in a boundary position, a process for setting initial values are required in addition to the addition process of step I3, I4.

(B-1) Operation of Buffer Control Section 213 by Read-Time Method b1

When the read command from the host is executed, the buffer control section 213 initializes the disk pointer 213b and host pointer 213c, and sets a subtraction check value (to be described later) in the register 213A (steps H1 to H3).

Then in the HDC 21, the read-out of the data, which was requested by the read command from the host, from the disk 11 to the buffer memory 211, and the transfer of data from the buffer memory 211 to the host are executed in parallel. If the transfer of the data requested by the read command to the host is completed, the preread is started (step H3).

The buffer area of buffer memory 211 (the read-data buffer area in this case) is used in an annular shape, as was described in connection with the prior art. Thus, the "full" state of the buffer memory 211 (the buffer region of memory 211) is detected by the fact that the disk pointer 213b has once moved round and caught up with the host pointer 213c.

Accordingly, in the method b1, after the preread is started, the buffer control section 213 in HDC detects that the disk pointer 213b has caught up with the host pointer 213c, i.e. that the value of the disk pointer 213b has become equal to that of the host pointer 213c by the addition operation in previous step G2 (steps H5 and H6). Thereby, the full state of the buffer memory 211 (the read-data buffer area of memory 211) is detected.

If the buffer control section 213 detects this state, it stops the preread. If the preread by the buffer control section 213 is stopped, the CPU 20 stops power supply to the hardware components (except the register section) relating to the disk access through the power control section 215.

If the buffer control section 213 detects the full state of the buffer memory 211 (the read-data buffer area in memory 211) and stops the preread, the buffer control section 213 repeats the operation of checking the host pointer 213c until the pointer 213c advances by a preset number of sectors which is set in advance by the pointer 213c (i.e. by a distance represented by the subtraction check value corresponding to the preset number of sectors) (steps H7 and H8). The fact that the host pointer 213c has advanced by a distance represented by the subtraction check value, that is, the value of the disk pointer 213b was once equal to that of the host pointer 213c and then the host pointer 213c has advanced by a distance represented by the subtraction check value, means that the disk pointer 213b has caught up with the host pointer 213c and then the host pointer 213c has advanced by a preset number of sectors. In this case, the buffer control section 213 determines that after the buffer memory 211 was filled, the transfer of data from the buffer memory 211 to the host was continued and space corresponding to a predetermined number of sectors has been caused. The buffer control section 213 thus issues the interrupt signal 204 to the CPU 20 (step H9).

(B-2) Operation of Buffer Control Section 213 by Write-Time Method b2

When the write command from the host is executed, the buffer control section 213 initializes the disk pointer 213b and host pointer 213c, and sets an addition check value (to be described later) in the register 213A (steps J1 to J3).

Then in the HDC 21, the transfer and write of the data, which was requested by the write command from the host, to the buffer memory 211 is started (step J4). In this case, the data read from the buffer memory 211 and the data write to the disk 11 are also started.

In this state the buffer control section 213 repeats the operation of checking the disk pointer 213b and host pointer 213c until the value of the disk pointer 213b becomes equal to that of the host pointer 213c due to the addition operation in previous step I4 (steps J5 to J7). If the value of the disk pointer 213b has become equal to that of the host pointer 213c by the addition, that is, if the data write from the buffer memory 211 to the disk 11 has been continued and the disk pointer 213b has caught up with the host pointer 213c, the buffer control section 213 determines that the buffer memory 211 (the write-data buffer area in memory 211) has become empty, and the control goes to step J8.

If the buffer memory 211 has become empty at the time of write, the CPU 20 stops power supply to the hardware components relating to the disk access through the power control section 215, while sector information to be written next is retained in the disk control section 214 in the HDC 21.

On the other hand, the buffer control section 213 repeats the operation of checking the host pointer 213c until the pointer 213c advances by a preset number of sectors (i.e. by a distance represented by the addition check value corresponding to the preset number of sectors) (steps J8 and J9). If the host pointer 213c has advanced by a distance corresponding to the addition check value, that is, if the disk pointer 213b caught up with the host pointer 213c by the addition (the write from the buffer memory 211 to the disk 11) and then the host pointer 213c has advanced by a preset number of sectors (i.e. if a preset number of sectors have been transferred from the host to the buffer memory 211), the buffer control section 213 determines that the buffer memory 211 was once emptied and has then become not empty. Thus, the buffer control section 213 issues the interrupt signal 204 to the CPU 20 (step J10).

The methods c1 and c2 will now be described with reference to FIGS. 8 and 17 to 20.

(C-0) Counter Structure in Buffer Control Section 213

In a case where methods c1 and c2 are applied to the HDD shown in FIG. 4, a sector counter (sector counter A) 213$d$ is provided in the buffer control section 213$d$ in HDC 21, for example, as shown in FIG. 8C. The sector counter 213$d$ counts the number of sectors of data to be input/output between the HDC 21 and buffer memory 211. In addition, a sector counter (sector counter B) 213$e$ is provided in the buffer control section 213. The sector counter 213$e$ counts the number of sectors of data to be input/output between the host and buffer memory 211.

At the time of read from the disk 11, as shown in the flow chart of FIG. 17, the sector counter A (213$d$) is incremented by 1 each time one-sector data is read out from the disk 11 and stored in the buffer memory 211 (steps K1 and K2). The sector counter B (213$e$) is incremented by 1 each time one-sector data is read out from the buffer memory 211 and transferred to the host (steps K3 and K4). These operations are repeated until the conditions for the end of the read operation are met (step K5).

On the other hand, at the time of write from the disk 11, as shown in the flow chart of FIG. 19, the sector counter B (213$e$) is incremented by 1 each time one-sector data is transferred from the host and stored in the buffer memory 211 (steps M1 and M2). The sector counter A (213$d$) is incremented by 1 each time one-sector data is read out from the buffer memory 211 and written on the disk 11 (steps M3 and M4). These operations are repeated until the conditions for the end of the write operation are met (step M5).

(C-1) Operation of Buffer Control Section 213 by Read-Time Method c1

When the read command from the host is executed, the buffer control section 213 initializes the sector counters A (213$d$) and B (213$e$) (to zero) and sets a subtraction check value (to be described later) in the register 213A (steps L1 and L2).

Then in the HDC 21, the read-out of the data, which was requested by the read command from the host, from the disk 11 to the buffer memory 211, and the transfer of data from the buffer memory 211 to the host are executed in parallel. If the transfer of the data requested by the read command to the host is completed, the preread is started (step L3).

In this state, the buffer control section 213 repeats the operation for checking the sector counters A and B until a difference between the counter values of both counters reaches a maximum (steps L4 and L5). If the difference between the counter values of both counters A and B reaches a maximum, that is, if the difference in value between sector counters A and B has reached a value (maximum) obtained by dividing the capacity (size) of the read-data buffer region defined in the buffer memory 211 by a data length of one sector, the buffer control section 213 determines that the buffer memory 211 (the read-data buffer area in memory 211) has been filled, and stops the preread. If the buffer memory 211 is filled and the preread is stopped, the CPU 20 stops power supply to the hardware components (except the register section) relating to disk access through the power control section 215.

On the other hand, the buffer control section 213 repeats the operation of checking the sector counters A and B until the difference between their counter values has decreased to a preset subtraction check value (steps L6 and L7). If the difference between the counter values of sector counters A and B decreased from the maximum to the subtraction check value (e.g. (maximum−)), that is, if the difference in value between sector counters A and B once became the maximum and then fell from the maximum (to the preset subtraction check value), the buffer control section 213 determines that the buffer memory 211 (the read-data buffer area in memory 211) was once filled and then space was caused therein and issues the interrupt signal 204 to the CPU 20 (step L8).

(C-2) Operation of Buffer Control Section 213 by Write-Time Method c2

When the write command from the host is executed, the buffer control section 213 initializes the sector counters A (213$d$) and B (213$e$) (to zero), and sets an addition check value (to be described later) in the register 213A (steps N1 and N2).

Then in the HDC 21, the transfer and write of data requested by the write command from the host into the buffer memory 211 is started (step N3). In this case, the read-out of data from the buffer memory 211 and the write of data to the disk 11 are also started.

In this state, the buffer control section 213 repeats the operation for checking the sector counters sector counters A and B until their counter values, except initial values, agree with each other (steps N4 and N5). If the counter values of sector counters B and A agree, that is, if the difference between the values of counters B and A becomes zero, the buffer control section 213 determines that the buffer memory 211 (the write-data buffer area in memory 211) has been emptied, and the control goes to step N6.

If the buffer memory 211 is emptied at the time of write, the CPU 20 stops power supply to the hardware components relating to disk access through the power control section 215, while sector information to be written next is retained in the disk control section 214 in the HDC 21.

On the other hand, the buffer control section 213 repeats the operation of checking the sector counters A and B until the difference between their counter values increases to the addition check value (steps N6 and N7). If the difference in value between the sector counters B and A increased from zero to the addition check value (e.g. 1), that is, if the difference in value between sector counters B and A once became zero and then increased from zero (to the preset addition check value), the buffer control section 213 determines that the buffer memory 211 (the write-data buffer area in memory 211) was once emptied and then became "not empty" and issues the interrupt signal 204 to the CPU 20 (step N8).

In the above description, the present invention is applied to the hard-disk drive (HDD). This invention, however, is applicable to other types of disk storage apparatus such as a magneto-optic disk apparatus, if the disk apparatus includes a buffer memory for temporarily storing data to be read out from the disk medium and transferred to the host, and/or data to be transferred from the host and written in the disk medium.

According to the present invention, as has been described above in detail, the disk controller itself, which controls the buffer memory, detects that space is caused in the buffer memory in the disk read operation and that the buffer memory is not empty in the disk write operation. The disk controller outputs the corresponding detection signal and stops power supply to the circuit components relating to the disk access (disk read/write) operation until the main control means such as a CPU receives the detection signal. Thereby the power consumption in the disk storage apparatus can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk control apparatus comprising:

a disk controller for controlling a circuit which controls read operation for reading data from a disk to a host; and a CPU for controlling the circuit and the disk controller, wherein the disk controller comprises:
 a buffer memory for storing data being transferred between the host and the disk controller; and
 a notification means for notifying the CPU that a first state in which an all buffer region of the buffer memory is stored with data to be transferred to the host transits to a second state in which a predetermined space occurs in the buffer region of the buffer memory by transferring data to the host,
 and the CPU comprises a main control means for stopping power supply to the circuit during the first state and for supplying power to the circuit in response to a notification from the notification means.

2. A disk control apparatus comprising:

a disk controller for controlling a circuit which controls write operation for writing data to a disk from a host; and a CPU for controlling the circuit and the disk controller, wherein the disk controller comprises:
 a buffer memory for storing data being transferred between the host and the disk controller; and
 a notification means for notifying the CPU that a first state in which data to be written to the disk is not exist in a buffer region of the buffer memory transits to a second state in which a predetermined space occurs in the buffer region of the buffer memory by transferring data from the host,
 and the CPU comprises a main control means for stopping power supply to the circuit during the first state and for supplying power to the circuit in response to a notification from the notification means.

3. A disk storage apparatus comprising:

read means for reading data form a disk medium;

power control means for controlling drive power supply with regard to the read means;

a buffer memory in which read-data buffer region for temporary storing data read from the disk medium is provided, a disk controller for controlling communications for a command and data to a host, control of the buffer memory and control for reading data from the disk medium through the read means;

buffer control means, provided in the disk controller, for outputting a detection signal in a case where a first state in which an all read-data buffer region of the buffer memory is stored with data to be transferred to the host transits to a second state in which a predetermined space occurs in the read-data region caused by transferring data to the host; and main control means for causing the power control means to stop drive power supply to the read means during the first state and for causing the power control supply to restart drive power supply to the read means in response to the detection signal.

4. A disk storage apparatus comprising:

write means for writing data to a disk;

power control means for controlling drive power supply with regard to the write means;

a buffer memory in which write-data buffer region for temporary storing data to be written in the disk medium from a host;

a disk controller for controlling communications for a command and data to the host, control of the buffer memory and control for writing data in the disk medium through the write means;

buffer control means, provided in the disk controller, for outputting a detection signal in a case where a first state in which an all write-data buffer region of the buffer memory has no data to be written in the buffer region transits to a second state in which a predetermined data exists in the write-data buffer region caused by transferring data from the host; and main control means for causing the power control means to stop drive power supply to the write means during the first state and for causing the power control supply to restart drive power supply to the write means in response to the detection signal.

5. A disk storage apparatus according to claim 3, wherein the buffer control means has a counter of which a counter value is incremented by one every time data having a first predetermined value is read out from the disk medium to the read-data buffer region of the buffer memory through the read means, and of which the counter value is decremented by one every time data having the first predetermined value is transferred to the host from the read-data buffer region, and means for outputting the detection signal when the value of the counter is decremented by a second predetermined value after the counter value is incremented to a value which equals to that a capacitance of the read-data buffer region is divided by the first predetermined value.

6. A disk storage apparatus according to claim 3, wherein the buffer control means comprises:
 a disk pointer for indicating a first data address in the buffer memory, the first data address in which data read from the disk medium through the read means to be stored;
 a host pointer for indicating a second data address in the buffer memory, the second data address to which data to be transferred next; and
 means for outputting the detection signal in a case where the host pointer decreases by a predetermined value after the disk pointer corresponds to the host pointer.

7. A disk storage apparatus according to claim 3, wherein the buffer control means comprises:
 a first counter of which a value is incremented by one every time data having a first predetermined value is read out from the disk medium through the read means to the read-data buffer region of the buffer memory;
 a second counter of which a value is incremented by one every time data having the first predetermined value is transferred to the host from the read-data buffer region of the buffer memory; and means for outputting the detection signal when a difference value between the values of the first and second counters are decremented to a second predetermined value after the difference value is incremented to a value which equals to that a capacitance of the read-data buffer region is divided by the first predetermined value.

8. A disk storage apparatus according to claim 4, wherein the buffer control means has a counter of which a counter value is incremented by one every time data having a first predetermined value is read out from the host to the write-data buffer region of the buffer memory through the read means, and of which the counter value is decremented by one every time data having the first predetermined value is written into the disk medium from the write-data buffer region through the write means; and means for outputting the detection signal when the value of the counter is incremented by a second predetermined value after the counter value equals to a zero by subtraction.

9. A disk storage apparatus according to claim 4, wherein the buffer control means comprises:
- a host pointer for indicating a first data address in the buffer memory, the first data address in which data read from the host to be stored;
- a disk pointer for indicating a second data address in the buffer memory, the second data address in which data to be stored next; and
- means for outputting the detection signal in a case where the host pointer is incremented by a predetermined value after the disk pointer corresponds to the host pointer.

10. A disk storage apparatus according to claim 4, wherein the buffer control means comprises:
- a first counter of which a value is incremented by one every time data having a first predetermined value is read out from the write-data buffer region of the buffer memory through the write means to the disk medium;
- a second counter of which a value is incremented by one every time data having the first predetermined value is transferred to the write-data buffer region of the buffer memory from the host; and
- means for outputting the detection signal when a difference value between the values of the first and second counters are incremented to a second predetermined value after the difference value is incremented to a zero by addition.

11. A disk storage apparatus according to claim 3, wherein the main control means is a CPU and receives the detection signal as an interrupt signal.

12. A disk storage apparatus according to claim 4, wherein the main control means is a CPU and receives the detection signal as an interrupt signal.

13. A disk controller comprising:

disk control means for controlling data read from a disk medium; and buffer control means for controlling a buffer memory in which read-data buffer region for temporary storing data read from the disk medium by using the disk control means, wherein the buffer control means comprises buffer monitor means for outputting a detection signal to a CPU as an interrupt signal in a case where a first state in which all read-data buffer region of the buffer memory is stored with data to be transferred to a host transits to a second state in which a predetermined space occurs in the read-data buffer region of the buffer memory caused by transferring data to the host.

14. A disk controller comprising:

disk control means for controlling data write to a disk medium; and buffer control means for controlling a buffer memory in which write-data buffer region for temporary storing data transferred from a host, wherein the buffer control means comprises buffer monitor means for outputting a detection signal to a CPU as an interrupt signal in a case where a first state in which all write-data buffer region of the buffer memory has no data to be written to the disk medium by using the disk control means transits to a second state in which a predetermined amount of data to be written exists by transferring data from a host.

15. A power supply control method comprising the steps of:

stopping drive power supply to a circuit for reading data from a disk medium during a first state in which all buffer region for temporary storing data read from the disk medium is stored with data to be transferred to a host;

outputting a detection signal when the first state transits to a second state in which a predetermined space occurs in the read-data buffer region by transferring data to the host; and supplying drive power to the circuit in response to the detection signal.

16. A power supply control method comprising the steps of:

stopping power supply to a circuit for writing data to a disk medium during a first state in which no data exists in a write-buffer region for temporary storing data to the disk medium;

outputting a detection signal in a case where the first state transits to a second state in which a predetermined amount of data to be written exists in the write-buffer region by transferring data from the host; and supplying drive power to the circuit in response to the detection signal.

* * * * *